US008474574B1

(12) United States Patent
Kobayashi et al.

(10) Patent No.: US 8,474,574 B1
(45) Date of Patent: Jul. 2, 2013

(54) SOUND ABSORBING STRUCTURE

(75) Inventors: Hisaaki Kobayashi, Minokamo (JP); Hiroshi Makino, Nagoya (JP); Yasuhiro Suzuki, Anjo (JP); Takahiro Ogo, Anjo (JP)

(73) Assignee: Inoac Corporation, Aichi (JP)

(*) Notice: Subject to any disclaimer, the term of this patent is extended or adjusted under 35 U.S.C. 154(b) by 0 days.

(21) Appl. No.: 13/545,252

(22) Filed: Jul. 10, 2012

Related U.S. Application Data

(63) Continuation of application No. 13/408,313, filed on Feb. 29, 2012, now abandoned.

(51) Int. Cl.
*F16F 15/04* (2006.01)
*F16F 15/02* (2006.01)

(52) U.S. Cl.
USPC ............................ 181/292; 181/288; 181/208

(58) Field of Classification Search
USPC ................ 181/292, 293, 288, 208, 207, 210, 181/296
See application file for complete search history.

(56) References Cited

U.S. PATENT DOCUMENTS

| | | | | |
|---|---|---|---|---|
| 4,705,139 | A * | 11/1987 | Gahlau et al. | 181/290 |
| 4,782,913 | A * | 11/1988 | Hoffmann et al. | 181/286 |
| 5,587,564 | A * | 12/1996 | Stief et al. | 181/295 |
| 6,153,286 | A * | 11/2000 | Pfaffelhuber et al. | 428/178 |
| 6,209,680 | B1 * | 4/2001 | Perdue | 181/295 |
| 6,568,135 | B1 * | 5/2003 | Yokoyama et al. | 52/145 |
| 6,983,821 | B2 * | 1/2006 | Putt et al. | 181/290 |
| 7,416,773 | B2 * | 8/2008 | Hiyama et al. | 428/117 |
| 2004/0129493 | A1 * | 7/2004 | Campbell | 181/204 |
| 2006/0169531 | A1 * | 8/2006 | Volker | 181/204 |
| 2007/0017739 | A1 * | 1/2007 | Yamagiwa et al. | 181/209 |
| 2008/0093164 | A1 | 4/2008 | Hiyama et al. | |
| 2008/0128202 | A1 * | 6/2008 | Palumbo et al. | 181/292 |
| 2010/0307867 | A1 * | 12/2010 | Ogawa et al. | 181/288 |

FOREIGN PATENT DOCUMENTS

| | | | | |
|---|---|---|---|---|
| JP | 06059680 | A | * | 3/1994 |
| JP | 08151704 | A | * | 6/1996 |
| JP | 2001222286 | A | * | 8/2001 |
| JP | 2004019062 | A | * | 1/2004 |
| JP | 2005017636 | A | * | 1/2005 |
| JP | 2005134653 | A | * | 5/2005 |

(Continued)

OTHER PUBLICATIONS

Japan Office Action in Japanese Patent Appl. No. 2010-086924, dated Jun. 20, 2011.
Office Action in Japanese Patent Appl. No. 2010-086924, dated Jun. 20, 2011.
Office Action in Japanese Patent Appl. No. 2010-086924, dated Oct. 31, 2011, together with an English language translation thereof.

*Primary Examiner* — Edgardo San Martin
(74) *Attorney, Agent, or Firm* — Greenblum & Bernstein, P.L.C.

(57) ABSTRACT

PROBLEMS
The present invention provides a sound absorbing structure that enables a sound absorbing rate thereof to be raised in a low-frequency region or medium-high frequency from around 500 Hz to 10 KHz, and a thickness thereof to be reduced.
SOLUTIONS
The sound absorbing structure has: a non-air permeable sheet molding object having, on one surface side thereof, a plurality of cavities including recesses formed by bending; and a non-air permeable surface sheet which is layered on the sheet molding object, on a cavity open-top side surface thereof, so as to cover open-top of the plurality of cavities, wherein the surface sheet is fixed at outer peripheral sections of the sheet molding object 11 and is not fixed to the sheet molding object at portions between adjacent cavities.

20 Claims, 22 Drawing Sheets

FOREIGN PATENT DOCUMENTS

| | | | | |
|---|---|---|---|---|
| JP | 2005247235 | A | * | 9/2005 |
| JP | 2005254478 | A | * | 9/2005 |
| JP | 2006204101 | A | * | 8/2006 |
| JP | U03-126554 | | | 10/2006 |
| JP | 2007047567 | A | * | 2/2007 |
| JP | 2007-515340 | | | 6/2007 |
| JP | 2008058712 | A | * | 3/2008 |
| JP | 2008122933 | A | * | 5/2008 |
| JP | 2008155811 | A | * | 7/2008 |
| JP | 2008203542 | A | * | 9/2008 |
| JP | 2010247597 | A | * | 11/2010 |

* cited by examiner

Reverberation Chamber Sound Absorbing Rate Evaluation Results 3
(sheet molding object C)

Reverberation Chamber Sound Absorbing Rate Evaluation Results 4
(sheet molding object D & D')

25-25 cross-sectional diagram

SOUND ABSORBING STRUCTURE

CROSS REFERENCE TO RELATED APPLICATION

The present application is a continuation application of U.S. patent application Ser. No. 13/408,313, filed on Feb. 29, 2012, the disclosure of which, including the specification, drawings, and claims, is incorporated herein by reference in its entirety.

FIELD OF THE INVENTION

The present invention relates to a sound absorbing structure including a sheet molding object having, on one surface thereof, a plurality of cavities of recesses, and a non-air-permeable surface sheet which is layered on the sheet molding object so as to cover open-tops of the cavities. Moreover, the present invention also relates to various sound absorbing structures exhibiting a high sound absorbing rate in both a medium-frequency region and a high-frequency region, by combining a plurality of the sound absorbing structures described above and providing an air-permeable cover thereon, or by forming multilayered sound absorbing structures.

BACKGROUND OF THE INVENTION

In the prior art, a honeycomb core consisting of cavities (chambers) enclosed by walls, the cavities having a triangular, quadrilateral, hexagonal (honeycomb), octagonal or circular planar shape, is used as a panel structure due to having light weight and good rigidity, but a honeycomb core is also known to have sound absorbing properties (rectifying effects) . Conventionally, it has been proposed to arrange a porous sound absorbing material directly on the front surface of a honeycomb core to form a sound absorbing structure, thereby improving the high-frequency sound absorbing properties of the porous sound absorbing material up to the medium-frequency region due to the rectifying effects of the honeycomb core and the effects of a rear air layer. However, according to this structure, in a low-frequency region of 500 Hz or below, improved sound absorbing properties are not obtained unless the honeycomb core is set to a thickness of 50 mm or greater, and hence the sound absorbing structure becomes heavy and cannot be used in narrow spaces.

Furthermore, it has been proposed that a sound absorbing panel be composed by bonding and integrating a sheet-shaped body and a honeycomb core. However, this structure has inferior properties as a sound absorbing panel, and is used principally as a sound insulating material.

Moreover, it has also been proposed to install an installation section in a frame shape about the periphery of a sheet-shaped body via a vibrating attenuation member (damping material), and to fix this frame to a rigid sheet member. However, this structure does not achieve good sound absorbing properties in a low-frequency region at 500 Hz or below, and has a large thickness.

Moreover, a method has also been proposed in which a honeycomb core is not employed, but rather an organic hybrid sheet (chemical composite comprising organic origomer material dispersed in matrix polymer) is applied to create 75 to 150 mm-square airtight spaces, and is caused to perform membrane oscillation. However, since a honeycomb core is not used inside this airtight space, then it is not possible to efficiently obtain a thin sound absorbing material having a high sound absorbing rate.

Of these structures, that which employs a honeycomb core involves bonding and integrating a sound absorbing material and a sheet-shaped body via a frame, which requires complex manufacturing steps; such a structure is directed to large sound absorbing panels, and proves to be expensive and heavy for small sound absorbing materials. Furthermore, if a honeycomb core is formed by extrusion molding, then the costs of the die are high and production costs rise. Moreover, a conventional sound absorbing structure has high rigidity in the honeycomb core, and therefore if there are slightly curved portions in the installation surface, the structure cannot readily follow the installation surface and gaps occur with respect to the installation surface.

In this way, a conventional sound absorbing structure has poor sound absorbing properties in a low-frequency region of 500 Hz or below, is large in size, has drawbacks in terms of cost and weight, and is difficult to install satisfactorily if there is curvature in the installation surface.

Furthermore, for the sound absorbing material, a porous sound absorbing material such as polyurethane foam, glass wool, nonwoven fabric, felt, or the like, is used. A porous sound absorbing material has high sound absorbing properties in respect of noise centered in a high-frequency region, but does not achieve good sound absorbing properties in respect of noise centered in a medium-frequency region, unless formed to a large thickness of 50 mm or greater, and therefore has low sound absorbing effects at normal thicknesses.

Therefore, a sound absorbing structure for medium and high-frequency regions has been proposed in which the apertures of a plurality of substantially tubular spaces (absorbing cavities) are covered with a sound absorbing material, such as a porous material, in order to improve sound absorbing properties in the medium-frequency region. Moreover, a sound absorbing material made of such as nonwoven cloth with regulated air permeability, and a sound absorbing sheet in which a nonwoven cloth with regulated air permeability, and the like, is layered onto the surface of a base material via an air layer, and the like, have also been proposed. However, in these sound absorbing materials, the thickness of the sound absorbing material must be made large in order to raise the sound absorbing rate in the medium-frequency region, and therefore countermeasures to noise are difficult to achieve in locations where, for instance, there is restricted space for installing sound absorbing material.

Furthermore, there has also been a proposal for an air sound absorbing member which has generally higher overall sound absorbing properties than a conventional resonance absorber in a range from a medium-frequency region to the high-frequency region, from approximately 400 Hz to approximately 10,000 Hz, in which a porous layer is provided on a plastic resonance absorber having a hollow chamber, the porous layer being provided separately from the hollow chamber. However, in the air noise absorbing member, the sound absorbing rate of the plastic resonance absorber (sound absorbing structure) is low, and furthermore because the covering porous layer does not make contact with the membrane oscillation body of the sound absorbing material, then the thickness of the air sound absorbing member becomes large.

BRIEF DESCRIPTION OF INVENTION

Problems to be Solved by the Invention

It is an object of the present invention to provide a sound absorbing structure, whereby the sound absorbing rate in a low-frequency region at around 500 Hz or below is raised, the thickness of the structure can be reduced, and which is lightweight and inexpensive and enables satisfactory installation in a case where there are curved portions on the installation surface. It is a further object of the present invention to provide a composite sound absorbing structure having a cover which can achieve a high sound absorbing rate from the medium-frequency region to the high-frequency region at around 500 Hz to 10,000 Hz and which can suppress increase in thickness, or a sound absorbing structure formed by a plurality of layers (called a "composite sound absorbing structure" or a "multi-layered sound absorbing structure" below).

Solutions to Problems

The present invention relates to a sound absorbing structure, having: a non-air permeable sheet molding object having, on one surface side thereof, a plurality of cavities of recesses formed by bending; and a non-air permeable surface sheet which is layered on the sheet molding object so as to cover open-top of the plurality of cavities; wherein the surface sheet is fixed at outer peripheral sections of the sheet molding object and is not fixed to the sheet molding object in portions between adjacent cavities. Hereafter, an "open-top" means an opening of a cavity and is not limited to mean an opening above the cavity. In a certain embodiment, the sound absorbing structure is arranged upside down, and the open-top may face downward.

Advantages of the Invention

According to the present invention, since the surface sheet is fixed to outer peripheral sections of the sheet molding object and is not fixed to the sheet molding object in the portions between the adjacent cavities, then it is possible to raise the sound absorbing rate in the low-frequency region at around 500 Hz or below, and it is also possible to reduce the thickness of the sound absorbing structure. Furthermore, by making it possible to reduce the thickness, it is possible to make the sound absorbing structure light in weight and inexpensive. Moreover, according to the present invention, since cavities are created by recess sections formed by bending, and the surface sheet is not fixed to the sheet molding object in the portions between adjacent cavities, then the sound absorbing structure can bend readily in the portions between cavities, and the sound absorbing structure can be installed satisfactorily even in cases where there are curved portions on the installation surface.

DESCRIPTIONS OF THE INVENTION

Figure 1:
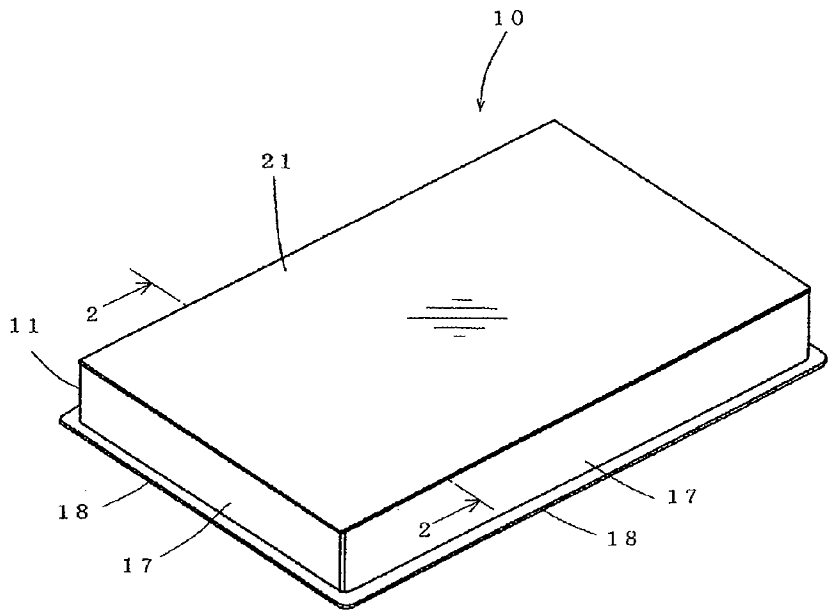
FIG. 1 is a perspective diagram of a sound absorbing structure relating to a first embodiment of the present invention.
Figure 2:
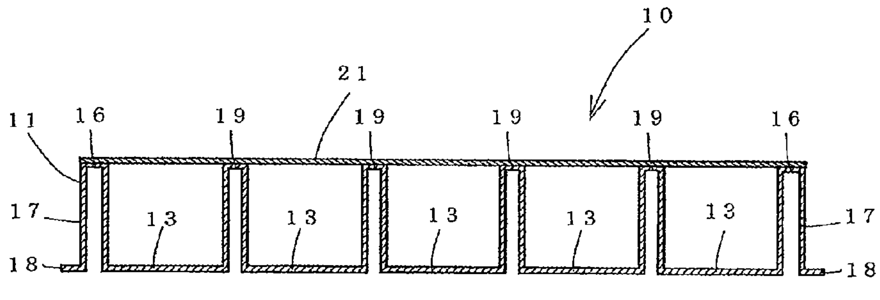
FIG. 2 is a cross-sectional diagram along 2-2 in FIG. 1.

Below, a sound absorbing structure relating to an embodiment of the present invention will be described by the drawings. The sound absorbing structure 10 according to the first embodiment which is illustrated in FIG. 1 and FIG. 2 includes a non-air permeable sheet molding object 11, and a non-air permeable surface sheet 21. The planer shape of the sound absorbing structure 10 is rectangular, but it may be of another shape.

Figure 3:
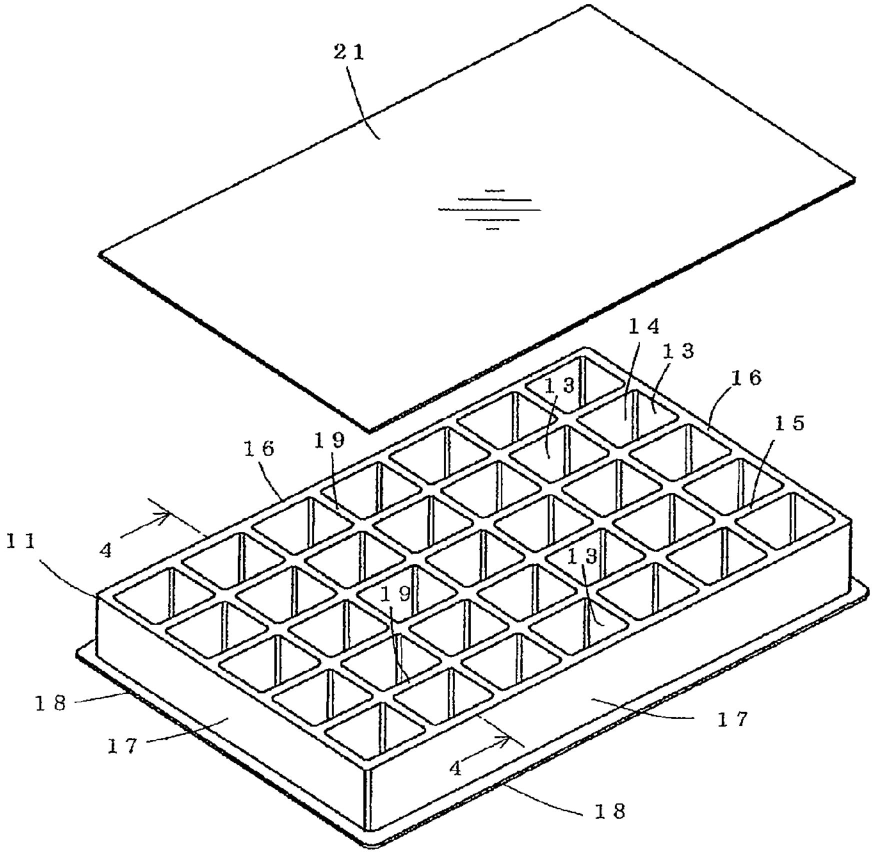
FIG. 3 is an exploded perspective diagram of a sound absorbing structure according to the first embodiment.
Figure 4:
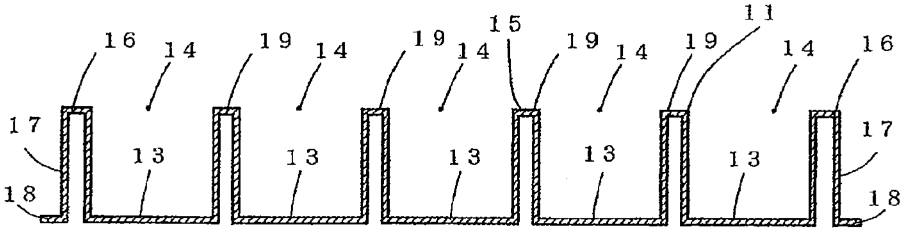
FIG. 4 is a cross-sectional diagram along 4-4 in FIG. 3.

As shown in FIG. 3 and FIG. 4, the sheet molding object 11 has, on one surface thereof, a plurality of cavities (chambers) 13 consisting of recess which are formed by bending a single non-air permeable sheet at a plurality of locations. The non air-permeable sheet may be made of resin, paper, inflammable paper made of ceramic, or the like, a metal such as aluminum, or the like, but a resin which is inexpensive and has excellent molding properties is especially desirable. More specific examples of the resin are: polypropylene, polyethylene, polystyrene, polyamide resin, polyvinyl chloride, polyurethane, styrene rubber, silicone rubber, polycarbonate, ABS resin, polyacrylonitrile, methyl polymethacrylate, fluorine resin, melamine resin, polyester resin, diallyl phthalate resin, and the like. Furthermore, the sheet used for the sheet molding object 11 may be a sheet having a thickness of up to approximately 2 mm (including sheet known as film), but if the sheet is too thin, then not only does this reduce the strength of the sheet molding object 11, but also the membrane oscillation of the sheet molding object 11 takes preference over (displays greater effects than) the membrane oscillation of the surface sheet 21, and therefore desirably the membrane oscillation of the sheet molding object 11 is restricted by setting a thickness of approximately 1 mm and the membrane oscillation of the surface sheet 21 is given preference (made to display greater effects), thereby improving the sound absorbing rate in the low frequency region is improved.

In the example illustrated, the shape of the open-top 14 of the cavities 13 is a quadrilateral planar shape, but the shape is not limited to this and may be a polygonal shape, such as a triangular, hexagonal or octagonal shape, or a circular shape, or the like. In particular, the cavities 13 desirably have a quadrilateral planar shape or a hexagonal planar shape, from the viewpoint of strength and moldability. If the planar size of the cavities 13 is too small or too large, then the sound absorbing rate declines, and therefore cavities having an edge or diameter size of 5 to 75 mm are desirable. Moreover, if the height of the cavities 13 is too low, then the sound absorbing rate falls, and if it is too high, then this leads to decline in the strength of the sheet molding object 11, and therefore a cavity height in the range of 5 to 50 mm is desirable and preferably in the range of 10 to 30 mm. Moreover, in the illustrated example, the arrangement of the cavities 13 is shown as a longitudinal and lateral arrangement in such a manner that a plurality of cavities 13 form columns and rows, but the arrangement of cavities is not limited to this.

Furthermore, the sheet molding object 11 according to the present embodiment has outer peripheral side surfaces 17 which are formed by bending the sheet molding object from the edges of the outer peripheral portions 16 of the sheet molding object on the open-top side surface 15, toward the opposite side to the open-top side surface 15, and also has flange sections 18 which are bent outwards from the ends of the outer peripheral side surfaces 17 (the ends on the side opposite to the open-top side surface 15). The outer peripheral surfaces 17 form a skirt shape which surrounds the outer periphery of the sides of the sheet molding object 11. The presence of the outer peripheral side surfaces 17 makes it possible to suppress membrane oscillation of the sheet molding object 11, and hence the sound absorbing rate produced by membrane oscillation of the surface sheet 21 can be improved. Furthermore, the flange sections 18 can be used as installation sections for the sound absorbing structure 10, and the sound absorbing structure 10 can be installed readily by fixing the flange sections 18 to installation sections by using a tacker, clincher, nails, pins, screws, or the like, as well as adhesive, double-sided tape or surface fasteners.

The sheet molding object 11, for example, can be molded readily from a single resin sheet, by vacuum molding, die molding, pressure molding, or the like. In particular, vacuum molding is most desirable from the viewpoint of the operability of the molding process and the quality of the molded object. A sheet molding object is formed by vacuum molding which is less expensive in terms of die costs than extrusion molding, and therefore it is possible to achieve inexpensive production costs for the sound absorbing structure.

The surface sheet 21 includes a non-air permeable sheet and is layered on the open-top side surface 15 of the cavities on the sheet molding object 11, so as to cover the open-tops 14 of the plurality of cavities 13. The surface sheet 21 is fixed to the sheet molding object 11 at the outer peripheral portions 16 of the sheet molding object on the cavity open-top side surface 15 of the sheet molding object 11, and is not fixed to the sheet molding object 11 in the portions 19 between adjacent cavities in the plurality of cavities 13. In the outer peripheral portions 16 of the sheet molding object, the sheet molding object 11 makes tight contact with the outer peripheral portions 16 of the sheet molding object, whereby the portion enclosed by the outer peripheral portions 16 of the sheet molding object, between the sheet molding object 11 and the surface sheet 21, forms an enclosed space.

It is important to form a closed space between the sheet molding object 11 and the surface sheet 21, by closing the surface sheet 21 and the sheet molding object 11 at the outer peripheral sections 16 of the sheet molding object on the open-top side surface 15, and if the surface sheet 21 is not completely fixed, or is only partially fixed (in other words, partially open), at the outer peripheral sections 16 of the sheet molding object on the cavity open-top side surface 15, then sound cannot be absorbed sufficiently in the low-frequency region by membrane oscillation of the surface sheet 21, and the sound absorbing region is shifted to a high-frequency region. The sound absorbing region is shifted to a high-frequency region. However, even if the surface sheet 21 is not fixed completely to the sheet molding object 11 at the outer peripheral sections 16 of the sheet molding object, it is still possible to achieve the object of the present invention provided that a closed space can be formed effectively between the sheet molding object 11 and the surface sheet 21 in such a manner that the peak frequency is not shifted to a high frequency, by ensuring tight contact between the surface sheet 21 and the outer peripheral sections 16 of the sheet molding object by means of a composition such as the sound absorbing structures 101, 102, 103 according to the second embodiment illustrated in FIG. 5. The fixing of the surface sheet 21 to the outer peripheral sections 16 of the sheet molding object refers to a state where the surface sheet 21 is in tight contact with the outer peripheral sections 16 of the sheet molding object and hence the surface sheet 21 is impeded from moving at the outer peripheral sections 16, but is not limited to a state where the surface sheet 21 is fixed to the outer peripheral sections 16 by adhesive, or the like. In other words, the method of fixing the surface sheet 21 to the sheet molding object 11 may adopt any one or a plurality of commonly known joining methods, such as adhesion, welding, fusion, pressure bonding, and the like. An adhesion method may employ an adhesive or cement, or double-sided adhesive tape, vinyl tape, or the like. Moreover, a welding or fusion method may employ high-frequency or ultrasonic welding, or the like. Furthermore, a pressure bonding method may employ coupling by means of projections and indentations in the sheets, interlocking of the sheets, differential dimensions or gradients, and so on, and may also employ a coupling jig. A sound absorbing structure according to a second embodiment illustrated in FIG. 5 is described below.

Figures 1, 5:
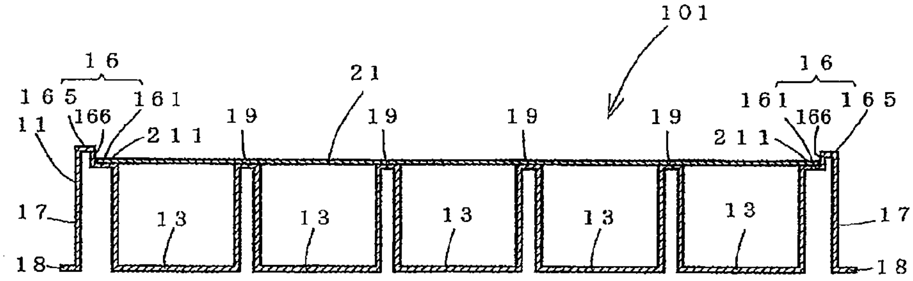
FIG. 5 is a cross-sectional diagram of respective sound absorbing structures relating to a second embodiment.
Figures 2, 5:
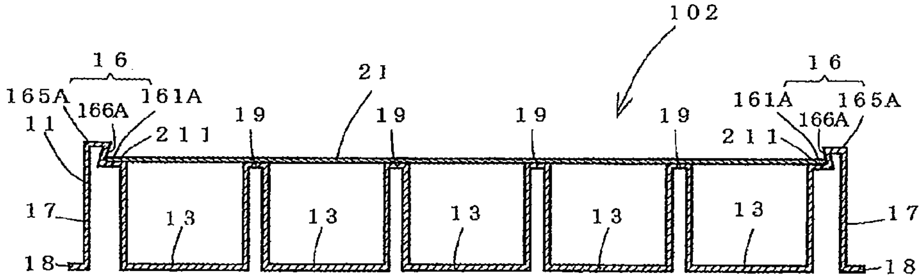
Figures 3, 5:
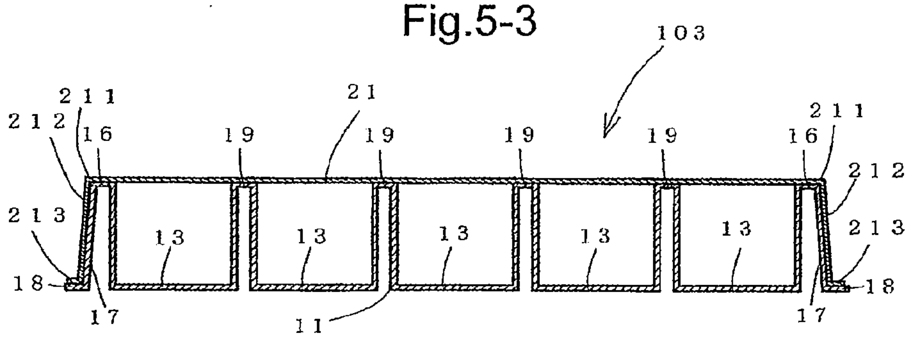

In the sound absorbing structure 101 illustrated in FIG. 5-1, the outer peripheral sections 16 of a sheet molding object 11, on the cavity open-top side surface, are each composed by an outer-peripheral-section inside-section 161 on which an edge section 211 of a surface sheet 21 is placed, and an outer-peripheral-section outer-frame section 165 which is erected on the outer periphery of the outer-peripheral-section inside-section 161, in such a manner that the edge sections 211 of the surface sheet 21 fit inside the outer-peripheral-section outer-frame sections 165 and make tight contact with inner wall surfaces 166 of the outer-peripheral-section outer-frame sections 165 and the outer-peripheral-section inside-sections 161. By adopting a composition of this kind, although the surface sheet 21 is partially fixed to the outer peripheral sections 16, it is possible to form a closed space between the surface sheet 21 and the sheet molding object 11, and the sound absorbing rate in the low-frequency region can be improved. Furthermore, due to the presence of the outer-peripheral-section outer-frame sections, positional registration can be performed easily when fixing the surface sheet, and furthermore, it is possible to form a closed space between the surface sheet and the sheet molding object, even though the edge sections of the surface sheet are fixed partially. Moreover, the surface sheet can be fixed simply by fitting the surface sheet into the portion enclosed by the outer-peripheral-section outer-frame sections, for instance, and hence the task of fixing the surface sheet is simplified and the production costs of the sound absorbing structure can be lowered. The height of the outer-peripheral-section outer-frame sections 165, with respect to the outer-peripheral-section inside-sections 161, should be equal to or greater than the thickness of the surface sheet 21, in other words, approximately 2 mm or greater.

In the sound absorbing structure 102 illustrated in FIG. 5-2, the outer peripheral sections 16 of a sheet molding object 11, on the cavity open-top side surface, are each composed by an outer-peripheral-section inside-section 161A on which an edge section 211 of a surface sheet 21 is placed, and an outer-peripheral-section outer-frame section 165A which is erected on the outer periphery of the outer-peripheral-section inside-section 161A, and furthermore, inner wall surfaces 166A of the outer-peripheral-section outer-frame sections 165A are inclined inwards in such a manner that the space enclosed by the outer-peripheral-section outer-frame sections 165A becomes smaller towards the top ends of the outer-peripheral-section outer-frame sections 165A. By adopting a composition of this kind, when the edge portions 211 of the surface sheet are fitted between the outer-peripheral-section inside-sections 161A and the outer-peripheral-section outer-frame sections 165A, they simultaneously become immovable and form tight contact with the inner wall surfaces 166A of the outer-peripheral-section inside-sections 161A and the outer-peripheral-section outer-frame sections 165A and can be fixed in place without a process such as adhesion, fusion, or the like, and hence a closed space can be formed between the surface sheet 21 and the sheet molding object 11. Furthermore, it is possible to lower production costs, since the sound absorbing structure is achieved simply by fitting the surface sheet into the sheet molding object, without using an adhesion or fusion step, or the like.

In the sound absorbing structure 103 illustrated in FIG. 5-3, outer peripheral bent surfaces 212 which are bent towards the side of the sheet molding object 11 are provided at the outer periphery of edge portions 211 of a surface sheet 21, and furthermore, according to requirements, flange sections 213 which bend outwards from the ends of the outer peripheral bent surfaces 212 are also provided, the bending angle of the outer peripheral bent surfaces 212 of the surface sheet 21 and the angle of inclination of the outer peripheral side surfaces 17 of the sheet molding object 11 being adjusted in such a manner that the outer peripheral bent surfaces 212 contact the outer peripheral side surfaces 17 of the sheet molding object 11, and in a state where the surface sheet 21 is in tight contact with (pressed against) the outer peripheral sections 16 of the sheet molding object, either the outer peripheral bent surfaces 212 of the surface sheet 21 are bonded to the outer peripheral side surfaces 17 of the sheet molding object 11 by adhesion, or the flange sections 213 of the surface sheet 21 are bonded by adhesion or fusion to flange sections 18 on the sheet molding object 11, or projections and indentations designed to engage with the surface sheet 21 and the outer peripheral bent surfaces 212 of the surface sheet 21 are provided in the outer peripheral sections 16 of the sheet molding object, or pressure bonding using coupling parts, and the like, (not illustrated) is employed, whereby a closed space can be formed between the surface sheet 21 and the sheet molding object 11.

A common factor of the first embodiment to the third embodiment is that if the surface sheet 21 is fixed to the sheet molding object 11 by the portions 19 between mutually adjacent cavities of the plurality of cavities 13, in other words, the ridge portions between the cavities, then it is not possible to achieve adequate sound absorption in the low-frequency region by means of membrane oscillation of the surface sheet 21, and the sound absorbing region is shifted significantly towards the high-frequency region. Even if the surface sheet 21 is not fixed to the ridges between the cavities, but simply receives pressure therefrom, sound absorption due to membrane oscillation is restricted in a similar way to if it were fixed, and therefore the height of the ridges between cavities should be set slightly lower than the external periphery (a gap should be provided between the surface sheet 21 and the ridges between the cavities).

Furthermore, the non-fixed portions of the surface sheet 21 and the sheet molding object 11 are desirably ensured to be 100 mm square or greater, and more desirably, 150 mm square or greater. If the non-fixed portions are 100 mm square or greater, then sufficient membrane oscillation of the surface sheet 21 is achieved, and sound absorption in the low-frequency region is improved. Consequently, the size of the sound absorbing structure 10 is desirably at least 100 mm square or greater, excluding the outer peripheral sections 16 where the surface sheet 21 is fixed.

The non-air permeable sheet which constitutes the surface sheet 21 is made of a planar material (sheet), film, or the like, made of non-porous rubber or elastomer, metal, inorganic material, or the like. To give more specific examples, the sheet is made of a planar material (sheet), film, or the like, made of polypropylene, polyethylene, polystyrene, polyamide resin, polyvinyl chloride, polyurethane, styrene rubber, silicone rubber, polycarbonate, ABS resin, polyacrylonitrile, methyl polymethacrylate, fluorine resin, melamine resin, polyester resin, diallyl phthalate resin, or the like.

If the area density (area weight) of the surface sheet 21 is too low, then the peak frequency at which the sound absorbing rate peaks is shifted to the high-frequency side, and the sound absorbing rate also declines. Conversely, if the area density is too high, then although the peak frequency is shifted to the low-frequency side, membrane oscillation does not occur readily and the sound absorbing rate becomes lower. Therefore, a desirable area density is 0.05 to 2.0 kg/m$^2$. In order that membrane oscillation of the surface sheet 21 takes preference over (displays greater effects than) the membrane oscillation of the sheet molding object 11, it is desirable to compose the surface sheet 21 from a sheet having a thickness equal to or thinner than the sheet used to form the sheet molding object 11.

The light weight and bendability of this sound absorbing structure 10 can be utilized to arrange the structure on the inner surface of a noise generator, or the like, and the rear surface of the sound absorbing structure 10 can be fixed partially by an adhesive, double-sided tape, surface fasteners, or the like, and if flange sections are used, fixing is possible by using a tacker, clincher, nails, pins, screws, or the like. The method of arranging the sound absorbing structure may involve aligning a plurality of similar structures, or in order respond to a broad frequency range, to use sound absorbing structures stacked in a plurality of layers, to combine structures having different heights or film thicknesses, or to use a porous sound absorbing material of polyurethane foam material or nonwoven cloth on the front surface or in parallel arrangement. By this means, a high sound absorbing rate is achieved over a broad frequency range and not only at a main peak, and hence an effective countermeasure can be achieved in respect of noise having a broad central frequency, noise having a variable central frequency, or the like.

If the structure is stacked in a plurality of layers, or a porous sound absorbing material is used on the front surface (the upper surface of the surface sheet), then fixing is desirable, and the structure and material can be bonded partially or over the whole surface thereof, by means of double-sided tape or adhesive, or the like. By this means, the rear surface of the sheet molding object in one sound absorbing structure is fixed and layered onto the upper surface of the surface sheet of another sound absorbing structure, and therefore the area density of the surface sheet is raised in comparison with the effect obtained when the sheet molding object is simply layered without being fixed, and a higher sound absorbing rate is obtained. Moreover, if porous sound absorbing materials are used in parallel, then these are effective if arranged in the flange sections of the sound absorbing structure, or in the gaps between sound absorbing structures, and furthermore, in cases where compatibility with a high-frequency region is required, a uniform sound absorbing measure can be achieved if the materials are arranged alternately in a staggered matrix configuration, or the like.

Figure 6:
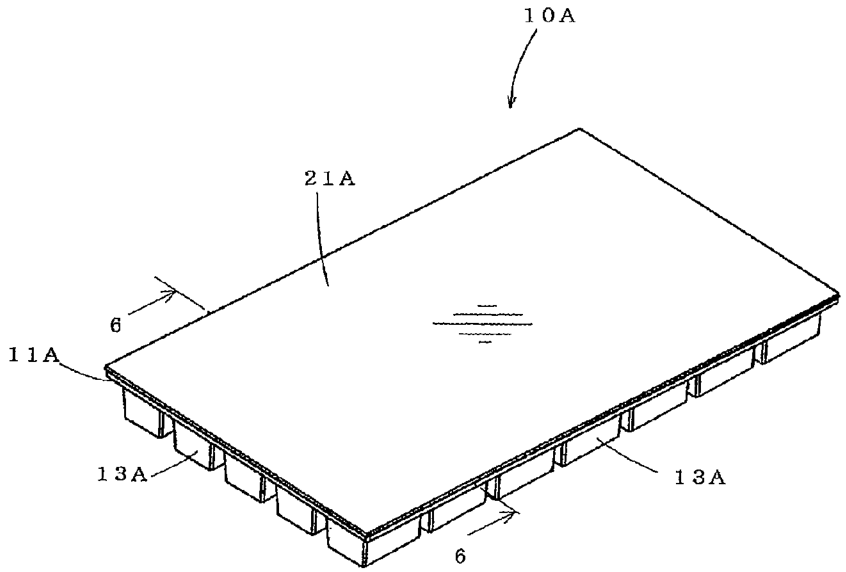
FIG. 6 is a perspective diagram of a sound absorbing structure relating to a third embodiment.
Figure 7:
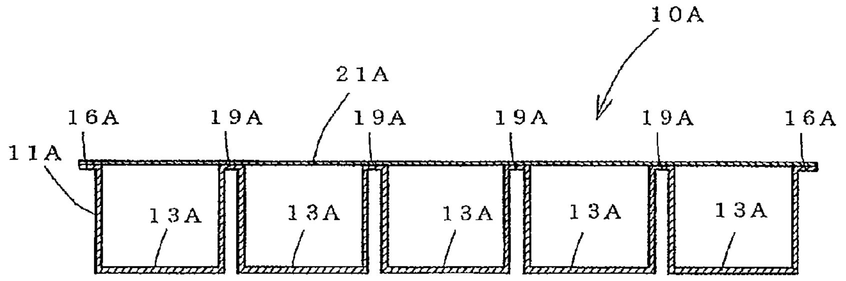
FIG. 7 is a cross-sectional diagram along 6-6 in FIG. 6.
Figure 8:
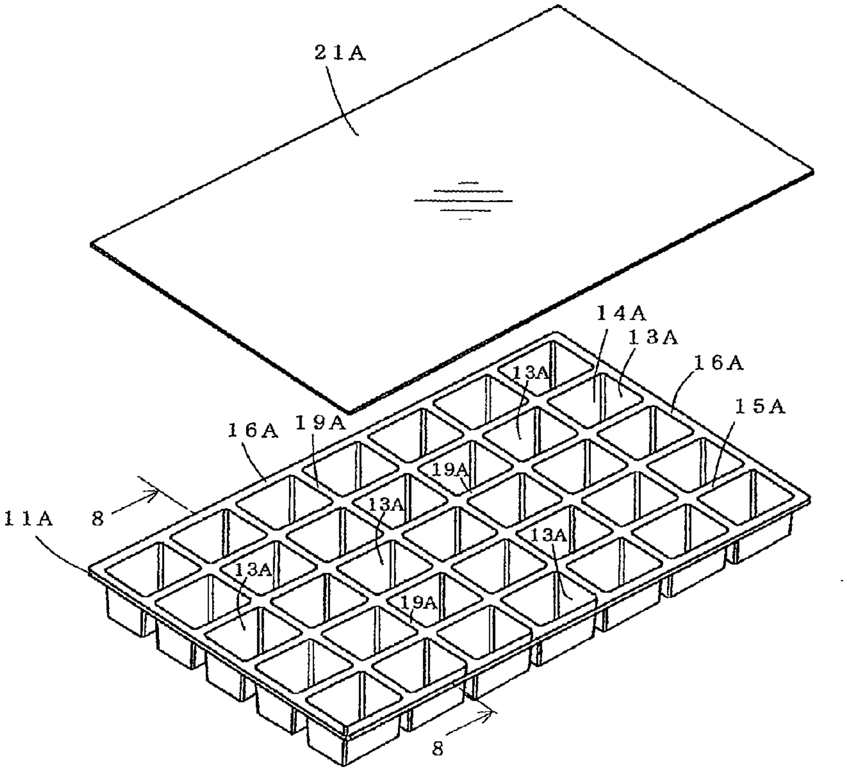
FIG. 8 is an exploded perspective diagram of a sound absorbing structure according to the third embodiment.
Figure 9:
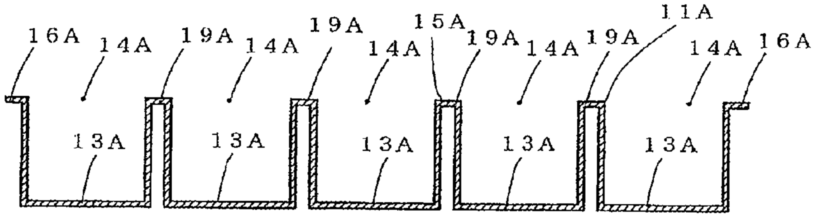
FIG. 9 is a cross-sectional diagram along 8-8 in FIG. 8.

The sound absorbing structure 10A relating to a third embodiment, which is illustrated in FIG. 6 and FIG. 7 does not have the outer peripheral side surfaces 17 or flange sections 18 of the sheet molding object 11 in the sound absorbing structure 10 according to the first embodiment, and the remainder of the composition is the same as the sound absorbing structure 10 according to the first embodiment. FIG. 8 is an exploded perspective diagram of the sound absorbing structure 10A according to a third embodiment and FIG. 9 is a cross-sectional diagram along 8-8 in FIG. 8. In FIG. 6 to FIG. 9, numeral 11A denotes a sheet molding object, 13A denotes a cavity, 14A denotes an open-top of a cavity, 15A denotes a cavity open-top side surface of the sheet molding object, 16A denotes an outer peripheral section of the sheet molding object on the cavity open-top side surface 15A, 19A denotes a portion between adjacent cavities (a cavity ridge) and 21A denotes a surface sheet. In the sound absorbing structure 10A, it is possible to compose each of the outer peripheral sections by an outer-peripheral-section inside-section and an outer-peripheral-section outer-frame section, as in the sheet molding object of the sound absorbing structures 101, 102 according to the second embodiment.

Figure 10:
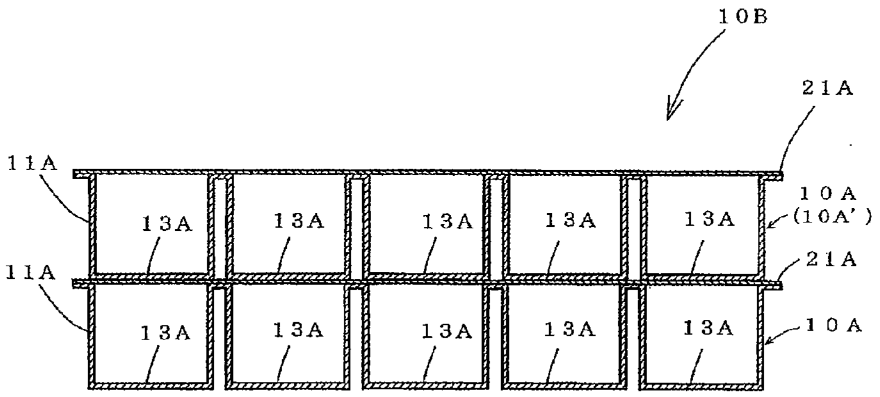
FIG. 10 is a cross-sectional diagram of a sound absorbing structure relating to a fourth embodiment.

Here, an embodiment of a layered sound absorbing structure in which a plurality of sound absorbing structures are stacked in a plurality of layers will be described. The sound absorbing structure 10B relating to the fourth embodiment illustrated in FIG. 10 is formed by layering the sound absorbing structure 10A according to the third embodiment, in two layers, by fixing and layering the rear surface of the sheet molding object 11A of the upper-side sound absorbing structure 10A' onto the upper surface of the surface sheet 21A of the lower-side sound absorbing structure 10A by adhesion, or the like. The number of layers of the sound absorbing structure 10A is not limited to two layers, and may be three or more layers. Furthermore, the sound absorbing structures which are layered together are not limited to the sound absorbing structure 10A according to the third embodiment, and may also be any of the sound absorbing structures 10, 101, 102, 103 according to the first and second embodiments.

Figure 11:
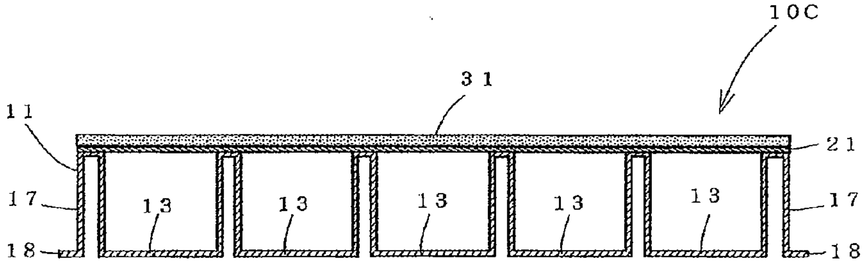
FIG. 11 is a cross-sectional diagram of a sound absorbing structure relating to a fifth embodiment.

Next, an embodiment in which a porous sound absorbing material is fixed and layered onto the upper surface of a surface sheet of the sound absorbing structure will be described. The sound absorbing structure 10C relating to a fifth embodiment which is illustrated in FIG. 11 is composed by fixing and layering a porous sound absorbing material 31, by adhesion, or the like, onto the upper surface of the surface sheet 21 in the sound absorbing structure 10 according to the first embodiment. For the porous sound absorbing material 31, it is possible to use polyurethane foam, nonwoven cloth, or the like. The sound absorbing structure onto which the porous sound absorbing material 31 is layered is not limited to the sound absorbing structure 10 according to the first embodiment and may be any of the sound absorbing structures 101, 102, 103, 10A, 10B according to the second to fourth embodiments. Furthermore, if a porous sound absorbing material is layered on top of a surface sheet according to the fourth embodiment in which a plurality of sound absorbing structures are layered together, then the porous sound absorbing material is fixed or layered onto the upper surface of the surface sheet in the sound absorbing structure in the topmost position. By this means, since the porous sound absorbing material is fixed and layered on the upper surface of the surface sheet, then the area density of the surface sheet is raised and a higher sound absorbing rate is obtained, compared to the effects obtained when the sound absorbing material is simply layered without being fixed.

Figure 18:
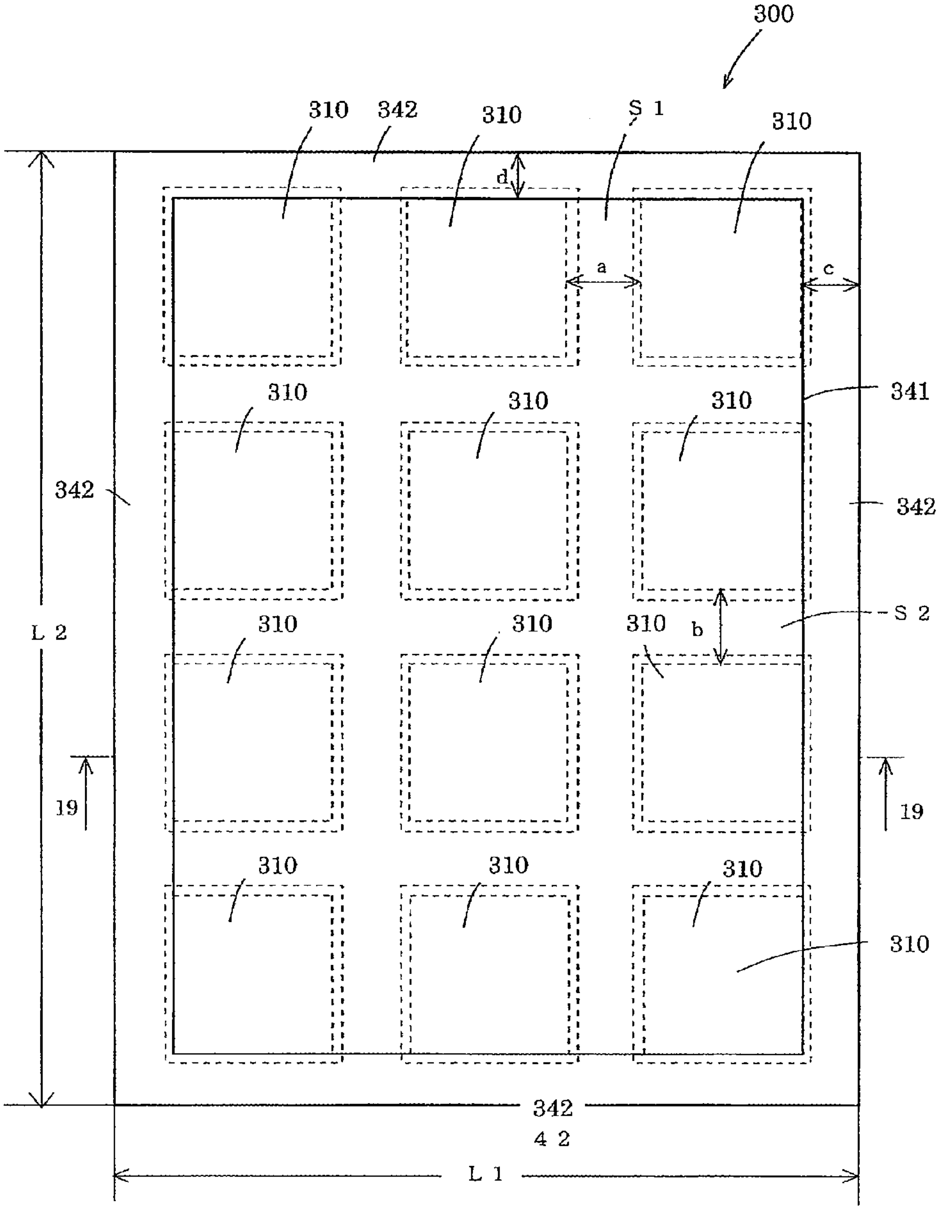
FIG. 18 is a plan diagram of a composite sound absorbing structure relating to a sixth embodiment of the present invention.
Figure 19:
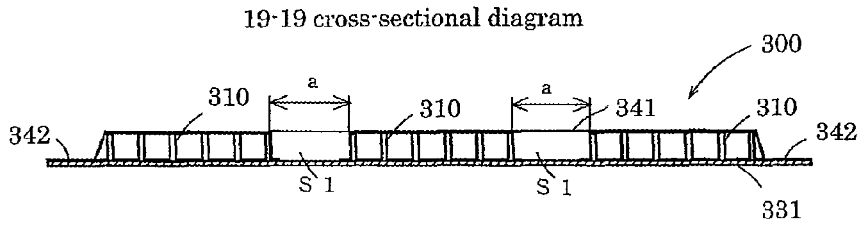
FIG. 19 is a cross-sectional diagram along 19-19 in FIG. 18.
Figure 20:
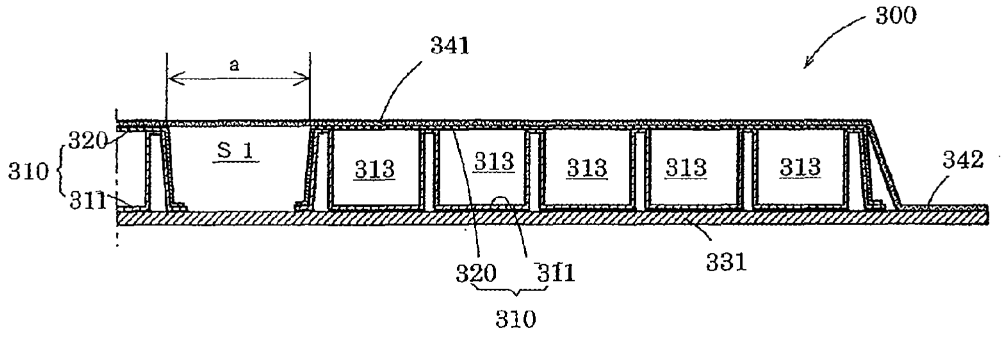
FIG. 20 is an enlarged cross-sectional diagram showing a portion of FIG. 19.

A composite sound absorbing structure for a medium to high-frequency region, which is characterized in absorbing sound at frequencies in the medium and high-frequency region, is described below with reference to the drawings. The composite sound absorbing structure 300 according to a sixth embodiment which is illustrated in FIG. 18 to FIG. 20 includes a base material 331, a sound absorbing structure 310 and a cover material 341.

The base material 331 includes a non-air permeable sheet of plastic, metal, wood, or the like, and corresponds to a cover, partition, sound insulating material, wall, or the like, of equipment for which a noise countermeasure is required. The base material 331 has one side of its surface with a size of which the plurality of sound absorbing structures 310 can be arranged and fixed at a prescribed interval and an optimal size of the sound absorbing structures 310 is decided in accordance with the size, number and gaps of the sound absorbing structures 310 which are arranged and fixed on the front surface of the base material. The reference numerals L1 and L2 in FIG. 18 indicate the dimensions of the perpendicular edges of the base material 331 which are formed in a quadrilateral shape.

Figure 21:
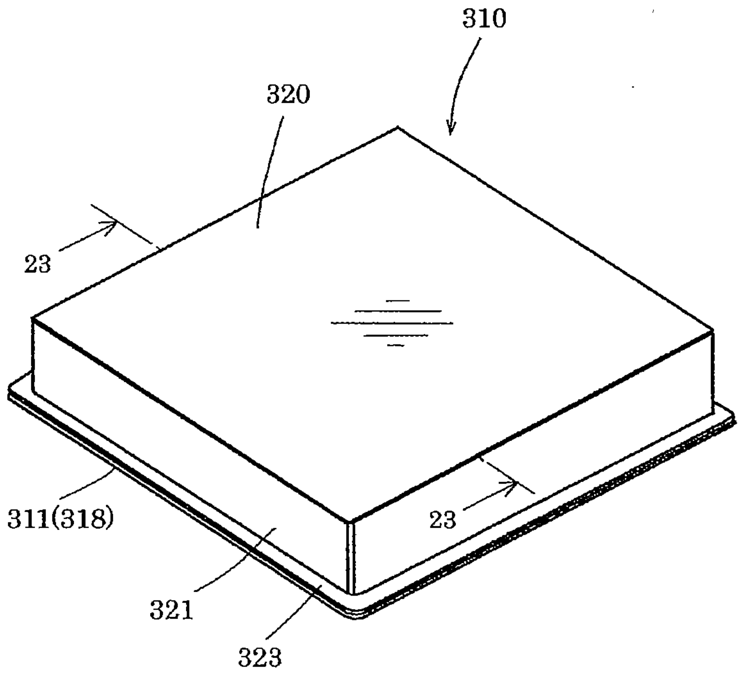
FIG. 21 is a perspective diagram relating to a sixth embodiment of a sound absorbing structure.
Figure 22:
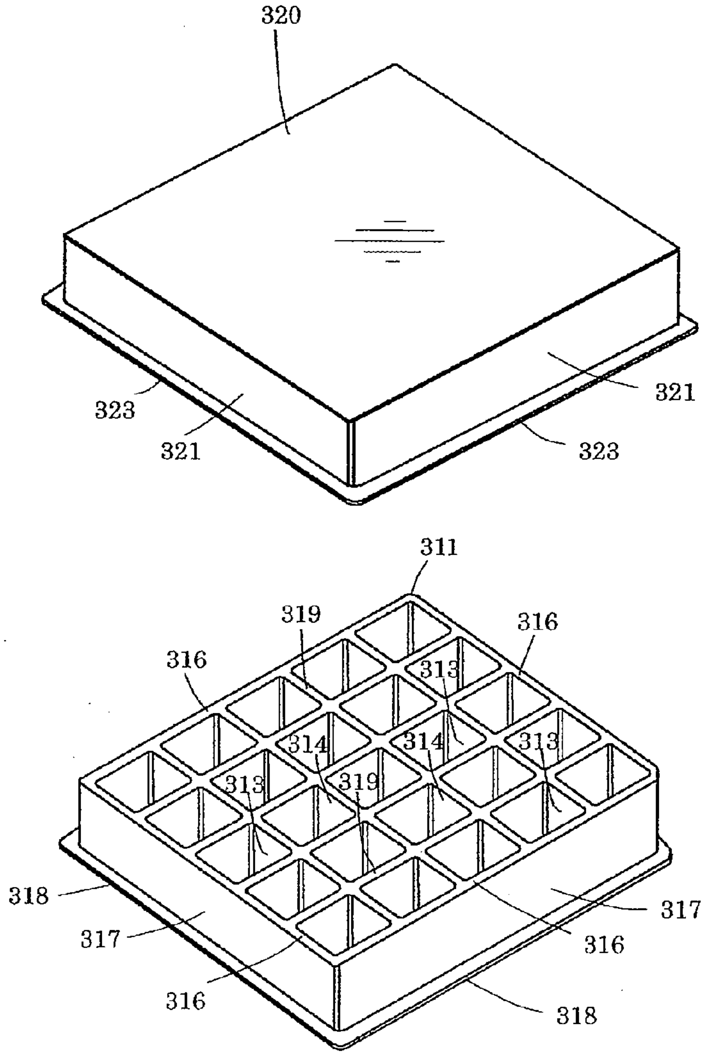
FIG. 22 is an exploded perspective diagram relating to the sixth embodiment of the sound absorbing structure.
Figure 23:
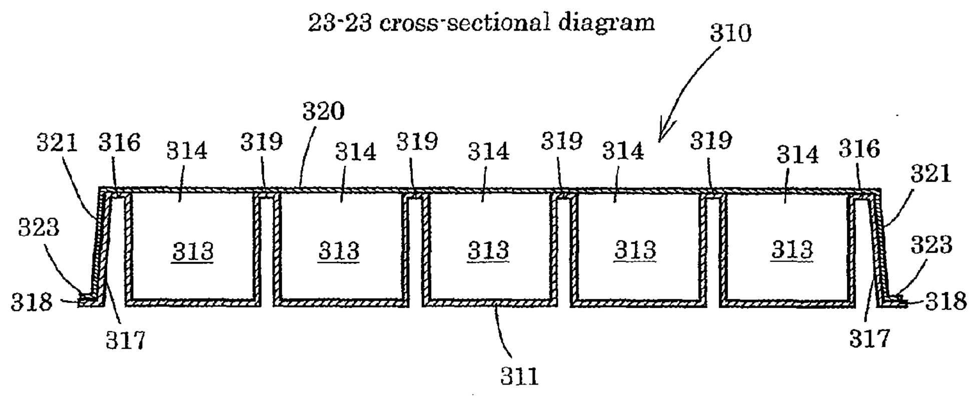
FIG. 23 is a cross-sectional diagram along 23-23 in FIG. 21.

The sound absorbing structure 310 is a sound absorbing material which absorbs sound in a range centered on a specific frequency of the medium-frequency region, by membrane oscillation, and has an air layer on one side of a surface sheet 320 including a non-air permeable sheet, this air layer being divided into cavity shapes by partitions. The sound absorbing structure 310 according to the sixth embodiment mainly includes a non-air permeable sheet molding object 311 and a surface sheet 320 which is layered on the sheet molding object 311, as shown in FIG. 21 to FIG. 23.

The cavities 313 correspond to an air layer on one side of the surface sheet 320 in the sound absorbing structure 310. In the example which is illustrated, the open-top shape of the cavities 313 is a quadrilateral planar shape, but similarly to the first embodiment, the shape of the is not limited to this. Moreover, if the height of the cavities 313 is too low, then the sound absorbing rate falls, and if it is too high, then this leads to decline in the strength of the sheet molding object 311, as well as causing the thickness of the composite sound absorbing structure 300 to increase, and therefore the cavity height is desirably in the range of 5 to 50 mm, and more desirably, the range of 10 to 30 mm. Furthermore, the reference numeral 319 in FIG. 22 is a partition between cavities 313. By arranging a plurality of cavities 313, it is possible to achieve a high sound absorbing rate in the medium-frequency region.

Furthermore, the flange sections 318 can be used as fixing sections for the sound absorbing structure 310, and when fixing the sound absorbing structure 310 to the surface of the base material 331, apart from providing adhesive, double-sided adhesive tape, cement, or the like, on the outer surfaces of the bottom portions of the cavities 313 of the sheet molding object 311, it is also possible to fix the flange sections 318 to the base material 331 by means of adhesive, double-sided adhesive tape, surface fasteners, tackers, clincher, nails, screw, pins, rivets, or the like.

The sheet molding object 311, for example, can be molded readily from a single resin sheet, by vacuum molding, press molding, pressurized air molding, or the like. In particular, vacuum molding is most desirable from the viewpoint of the operability of the molding process and the quality of the molded object.

The surface sheet 320 includes a non-air permeable sheet (which may be a film or sheet material) of a size which can form a lid for the plurality of cavities 313 in the sheet molding object 311. The material of the non-air permeable sheet includes a planar material (sheet), film, or the like, made of a non-porous general resin, a rubber or elastomer, a metal or an inorganic material, or the like. To give more specific examples, the sheet is made of a planar material (sheet), film, or the like, made of polypropylene, polyethylene, polystyrene, polyamide resin, polyvinyl chloride, polyurethane, styrene rubber, silicone rubber, polycarbonate, ABS resin, polyacrylonitrile, methyl polymethacrylate, fluorine resin, melamine resin, polyester resin, diallyl phthalate resin, polyphenylene ether, or the like.

The surface sheet 320 according to the present embodiment is formed by vacuum molding of a resin sheet or polypropylene, or the like, and has outer peripheral side surfaces 321 which are bent toward the sheet molding object 311 from the edges of the surface sheet 320, as well as having flange sections 323 which are bent outwards from the end portions of the outer peripheral side surfaces 321, thereby forming a lid shape which covers the sheet molding object 311 from the side of the open-tops of the cavities 313. The outer peripheral side surfaces 321 of the surface sheet 320 are fixed by adhesion, fusion, or the like, to the outer peripheral side surfaces 317 of the sheet molding object 311, and furthermore, the flange sections 323 of the surface sheet 320 are fixed by adhesion, fusion, or the like, to the flange sections 318 of the sheet molding object 311, or the outer peripheral side surfaces 321, and the like, of the surface sheet 320 are engaged with engaging sections (not illustrated) provided in the outer peripheral side surfaces 317, or the like, of the sheet molding object 311, thereby forming a closed space between the surface sheet 320 and the sheet molding object 311. It is also possible to adopt a flat surface sheet 320 which is not provided with outer peripheral side surfaces 321 and flange sections 323, and to fix the outer peripheral sections of this surface sheet 320 to the outer peripheral sections 316 of the sheet molding object 311 by adhesion, fusion, or the like. It is desirable from the viewpoint of improving the sound absorbing rate while maintaining the main peak frequency in the medium frequency region that unfixed portions of a size of 100 mm square or greater should be present between the surface sheet 320 and the sheet molding object 311. In the example illustrated, the sheet molding object 311 and the surface sheet 320 are not fixed to each other in the portions between the adjacent cavities of the plurality of cavities 313, in other words, the partitions 319 between the cavities. The height of the partitions 319 between the cavities of the sheet molding object 311 should be lower than the height of the outer peripheral sections 316 of the sheet molding object 311, in such a manner that the surface sheet 320 is separated from the partitions 319 between the cavities by approximately 1 to 2 mm, for example.

The number of sound absorbing structures 310 which are arranged and fixed on the surface of the base material 331 is determined appropriately according to the size of the base material 331 and the sound absorbing structure 310, and so on. In the example in FIG. 18, twelve sound absorbing structures 310 are arranged and fixed on the surface of the base material 331, with gaps S1, S2 being provided between the mutually adjacent sound absorbing structures. Furthermore, the gaps between the sound absorbing structures 310 (in other words, the distances of the gaps S1, S2 between the adjacent sound absorbing structures 310) a, b and the gap c between the edges of the base material 331 and the sound absorbing structures 310, are determined appropriately.

Figure 24:
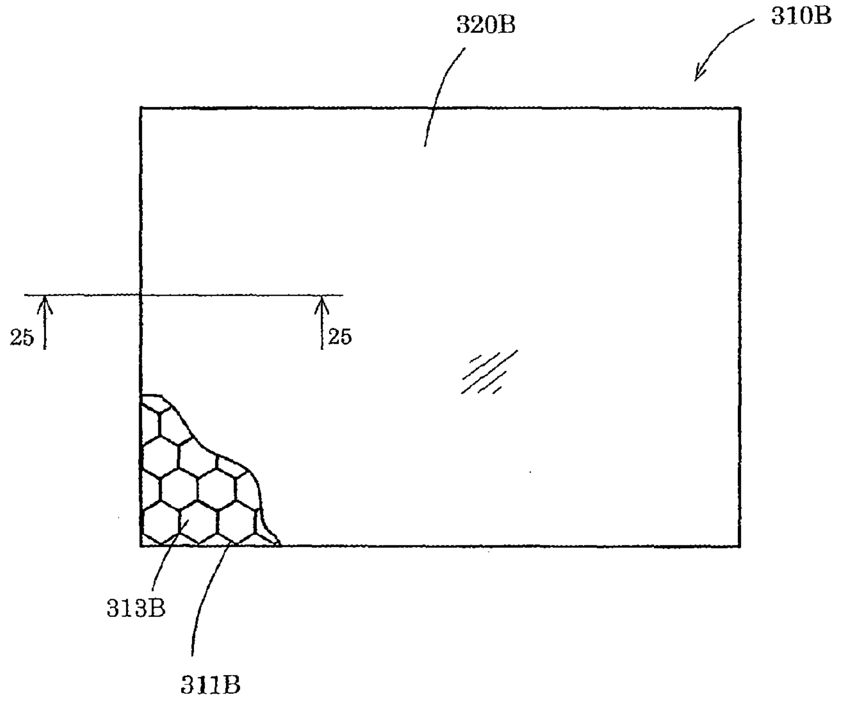
FIG. 24 is a plan diagram relating to a seventh embodiment of a sound absorbing structure.
Figure 25:
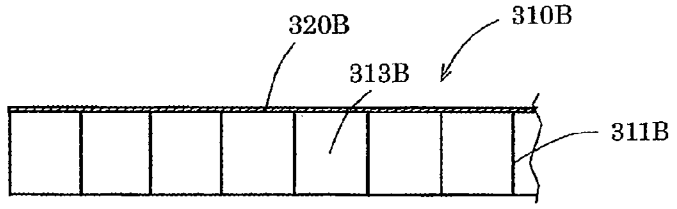
FIG. 25 is a cross-sectional diagram along 25-25 in FIG. 24.
Figure 26:
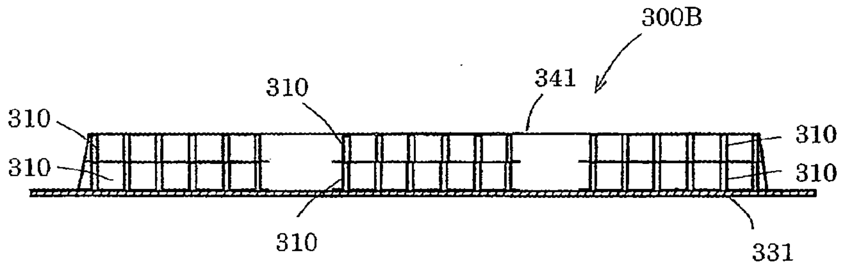
FIG. 26 is a cross-sectional diagram of a composite sound absorbing structure in which sound absorbing structures are layered in two layers.

The sound absorbing structures according to the present invention are not limited to a sound absorbing structure 310 including a sheet molding object 311, in which cavities are formed, created by bending a non-air permeable sheet, and the surface sheet 320 and may also be a sound absorbing structure in which a surface sheet 320B including a non-air permeable sheet is layered on a honeycomb material 311B in which quadrilateral, hexagonal or circular cavities 313B, or the like, are formed, as in the sound absorbing structure 310B of the seventh embodiment illustrated in FIG. 24 and FIG. 25, as described above. Since the ends of the paper or metal honeycomb cavities, and the like, do not coincide with each other, then it is also possible to provide an outer frame made of resin, wood, foamed material, or the like, about the outer periphery, and to also provide a butt end. Moreover, the composite sound absorbing structure according to the present invention is not limited to having one layer of a sound absorbing structure 310 as in the sound absorbing structure 300 illustrated in FIG. 18 to FIG. 20, but may also comprise sound absorbing structures 310 stacked in two layers, or stacked in a greater number of layers, as in the composite sound absorbing structure 300B in FIG. 26, within the range of tolerable increase in the thickness of the structure.

The cover material 341 includes an air permeable sheet, and has a size capable of covering the whole of the plurality of sound absorbing structures 310 which are arranged and fixed on the surface of the base material 331. The cover material 341 is layered on the surface of the surface sheets 320 in the plurality of sound absorbing structures 310 so as to cover the gaps S1, S2 between the sound absorbing structures 310, and the peripheral edges 342 of the cover material 341 are fixed to the edges of the base material 331 by double-sided tape, adhesive, cement, rivets, clincher, nails, or a combination of these, thereby substantially forming a closed space. This fixing process may be aligned with the outermost portions of the sound absorbing structure 310 which are arranged. Moreover, if the cover material 341 is fixed to the surfaces of the surface sheets 320 of the sound absorbing structures 310 by adhesive, double-sided adhesive tape, or the like, in addition to fixing the peripheral edge of the cover material 341 to the base material 331, then the sound absorbing rate in the medium-frequency region of the composite sound absorbing structure 300 can be shifted slightly toward a lower frequency region.

The air-permeable sheet which constitutes the cover material 341 may be an air permeable woven sheet consisting of long fibers and short fibers, a nonwoven fabric, or a sheet with holes, a foamed material, a sintered material with holes, and the like, and a sheet having flexibility, such as a fiber-based sheet or a sheet with holes, or the like, is more desirable. The fibers may be general organic fibers, such as polyester, polyamide, polypropylene (PP), acrylic, or the like, or inorganic fibers, such as carbon fibers, glass fibers, rock wool, metal fibers, or the like. For a sheet with holes, it is possible to use various types of films, sheets, or the like, in which very fine holes are formed at uniform intervals or randomly. The cover material 341 also forms a protective layer for the sound absorbing structure, and desirably employs a nonwoven fabric of waterproof polypropylene fibers or inorganic fibers, and furthermore, the cover material 341 may have a surface treatment for weather resistance, waterproofing, dustproofing, and the like, and may be combined variously in a resin.

The thickness of the cover material 341 is desirably 2 mm or less in order to suppress increase in the thickness of the composite sound absorbing structure 300, and from this viewpoint, the material of the cover material 341 is desirably a long-fiber spunbond nonwoven fabric, or a woven material. The thickness of the cover material 341 is more desirably 1 mm or less and even more desirably, 0.6 mm or less. Furthermore, the thickness of the cover material 341 also depends on the material of the cover material 341, but if the material is too thin, then the strength becomes weak and therefore a thickness of no less than 0.1 mm is desirable.

The air permeability of the cover material 341 (JIS L1096A, Frazier test) is desirably 1 to 100 cc/cm$^2$/s. More desirably, it is 3 to 60 cc/cm$^2$/s. A low air permeability of the cover material 341 tends to lead to increased sound absorbing properties in the high-frequency region, but if the air permeability is too low, then the sound absorbing properties in the high-frequency region decline and therefore an air permeability in the stated range is desirable.

The composite sound absorbing structure 300 according to the present invention has an increased sound absorbing rate in the medium-frequency region while suppressing increase in the thickness of the composite sound absorbing structure due to the sound absorbing structures 310, and furthermore, the sound absorbing rate in the high-frequency region is improved due to the presence of the spaces covered by the air permeable cover material 341 in the gaps between the sound absorbing structure 310.

EXAMPLE

Practical examples and comparison examples are described below.

Practical Example 1

Figure 12:
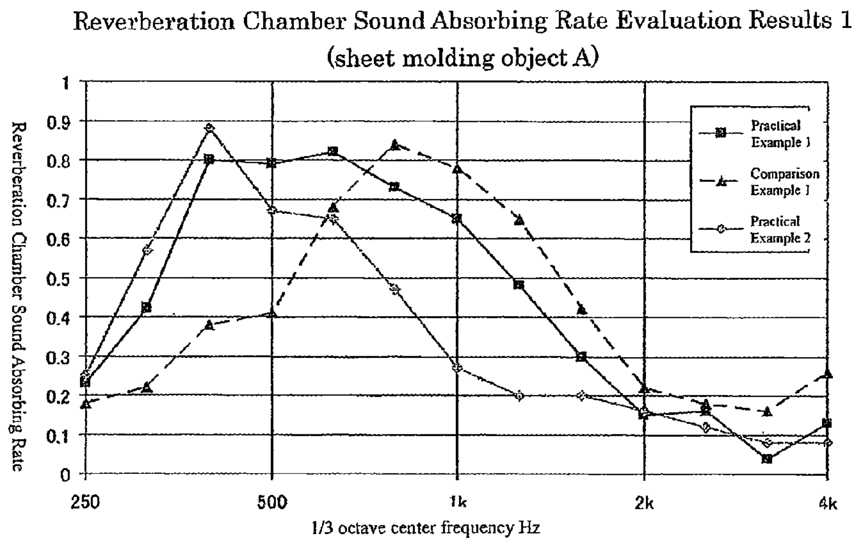
FIG. 12 is a graph of sound absorbing rate evaluation results 1 in a reverberation chamber.

A polypropylene sheet having a thickness of 1.0 mm was vacuum molded to form a sheet molding object A similar to the sheet molding object 11A illustrated in FIG. 8 and FIG. 9. The dimensions of the sheet molding object A were 190×190×27 mm. The cavities in the sheet molding object A had a square open-top shape with edges of 40 mm, a height of 27 mm, and the number of cavities was 4×4=16. Furthermore, the width of the portions between the adjacent cavities (the cavity ridge sections, the portions indicated by 19A in FIG. 8 and FIG. 9) was 6 mm, and the width of the outer peripheral sections on the cavity open-top side surface of the sheet molding object A (the portions indicated by 16A in FIG. 7 and FIG. 8) was 6 mm. Next, a surface sheet including a polypropylene sheet of 190×190×1 mm was layered on the cavity open-top side surface of the sheet molding object A, and the entire periphery of the surface sheet was bonded and fixed to the outer peripheral sections of the sheet molding object A with vinyl tape, thereby yielding a sound absorbing structure according to Practical Example 1. Sixteen of sound absorbing structures according to Practical Example 1 were taken, double-sided adhesive tape was applied to the whole of the rear surfaces thereof, the sound absorbing structures were arranged on the floor of a reverberant chamber with a spacing of approximately 10 mm therebetween, and the sound absorbing rate was measured by a reverberant chamber method on the basis of JIS A 1409. The volume of the reverberant chamber was 36 m$^3$. As a result of this, as shown in FIG. 12, a main peak of the sound absorbing rate was obtained at 400 to 630 Hz.

Comparison Example 1

A sound absorbing structure according to Comparison Example 1 was obtained by taking a sheet molding object obtained in a similar manner to Practical Example 1, applying an adhesive (Konishi "GP Clear") to the portions between the adjacent cavities (cavity ridge sections), bonding a surface sheet similar to Practical Example 1, to the sheet molding object, and bonding and fixing the whole perimeter of the surface sheet to the outer peripheral sections of the sheet molding object with vinyl tape. The sound absorbing rate was measured for Comparison Example 1, similarly to Practical Example 1. The result of this was that, as illustrated in FIG. 12, the main peak of the sound absorbing rate was shifted greatly, by 800 Hz, to the high-frequency side.

Practical Example 2

A sound absorbing structure according to Practical Example 2 was obtained by a similar manner to Practical Example 1, with the exception that outer peripheral side surfaces made of 0.6 mm-thick polypropylene sheet having a height of 27 mm (corresponding to the outer peripheral side surfaces 17 in FIG. 3 and FIG. 4) and flange sections (corresponding to the flange sections 18 in FIG. 3 and FIG. 4) having a width of 5 mm which project outwards from the ends of the outer peripheral side surfaces, were bonded by vinyl tape to the outer periphery of the sheet molding object obtained in Practical Example 1. The sound absorbing rate was measured for the sound absorbing structure of Practical Example 2, similarly to Practical Example 1. The result of this was that, as illustrated in FIG. 12, membrane oscillation of the sheet molding object which contributes to the sound absorbing rate at 500 Hz or above could be suppressed and the sound absorbing rate in the vicinity of 400 Hz could be improved by membrane oscillation of the surface sheet.

Practical Example 3

Figure 13:
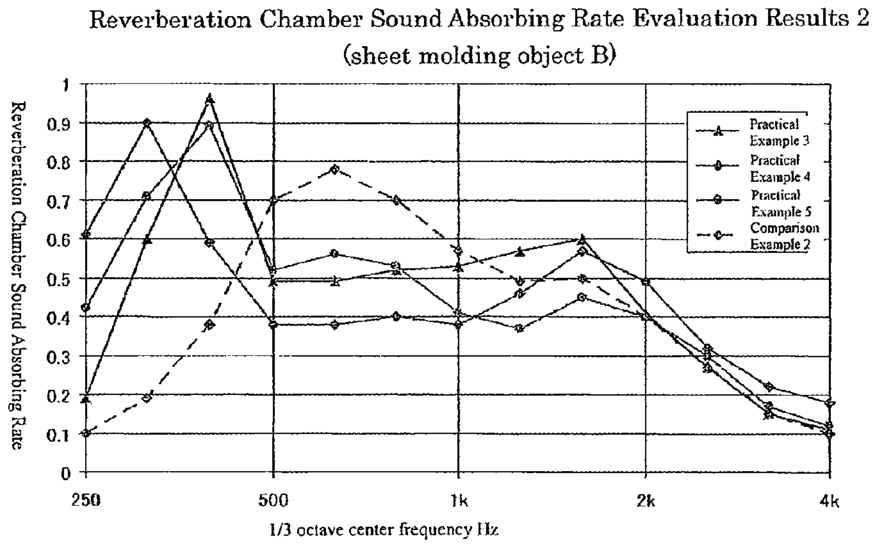
FIG. 13 is a graph of sound absorbing rate evaluation results 2 in a reverberation chamber.

A sheet molding object B having outer peripheral side surfaces 17 and flange sections 18 similar to the sheet molding object 11 in FIG. 3 and FIG. 4 was foamed by vacuum molding using a 0.7 mm-thick polypropylene sheet. The dimensions of the sheet molding object B were 275×210×25 mm. The cavities in the sheet molding object B had a rectangular open-top shape of 49×46 mm, a height of 23 mm (which is slightly lower than the outer peripheral height of 25 mm), and the number of cavities was 5×4=20. The width of the portions between the adjacent cavities (the cavity ridge sections, the portions indicated by 19 in FIG. 3 and FIG. 4) was 4 mm, and the width of the outer peripheral sections on the cavity open-top side surface of the sheet molding object B (the portions indicated by 16 in FIG. 3 and FIG. 4) was 7 mm. Furthermore, the height of the outer peripheral side surfaces (the portions indicated by reference numeral 17 in FIG. 3 and FIG. 4) was 25 mm, and the width of the flange sections (the portions indicated by reference numeral 18 in FIG. 3 and FIG. 4) was 7 mm. Next, a surface sheet including a polypropylene sheet of 275×210×1 mm was layered on the cavity open-top side surface of the sheet molding object B, and the entire periphery of the surface sheet was bonded and fixed to the outer peripheral sections of the sheet molding object with vinyl tape, thereby yielding a sound absorbing structure according to Practical Example 3. Twelve of sound absorbing structures according to Practical Example 3 were taken, double-sided adhesive tape was applied to the rear surfaces thereof, and the sound absorbing structure were arranged on the floor of a reverberation chamber with a spacing of approximately 10 mm therebetween, and the sound absorbing rate was measured. As a result of this, as illustrated in FIG. 13, a sharp main peak of the sound absorbing rate was obtained at 400 Hz.

Practical Example 4

A sound absorbing structure according to Practical Example 4 was obtained in a similar fashion to Practical Example 3, with the exception that the thickness of the surface sheet was set to 1.5 mm in Practical Example 3, and the sound absorbing rate was measured in a similar fashion. The result of this was that, as illustrated in FIG. 13, since the surface sheet was thicker, there was a sharp main peak of the sound absorbing rate at 315 Hz, which is approximately ⅓ octave to the low frequency side of Practical Example 3.

Practical Example 5

A sound absorbing structure according to Practical Example 5 was formed in a similar fashion to Practical Example 3, with the exception that the surface sheet was fixed by means of an adhesive (Konishi “GP Clear”) coated onto the whole of the outer peripheral sections of the cavity open-top side surface of the sheet molding object B (the portions indicated by 16 in FIG. 3 and FIG. 4), instead of by using vinyl tape as in Practical Example 3. Twelve of the sound absorbing structures according to Practical Example 5 were arranged directly on the floor of a reverberation chamber, without bonding double-sided adhesive tape to the rear surfaces thereof, and the sound absorbing rate was measured. The gaps between the sound absorbing structures were approximately 10 mm. The measurement results showed that, as illustrated in FIG. 13, there was a sharp main peak of the sound absorbing rate at 400 Hz, similarly to the case of Practical Example 3.

Comparison Example 2

A sound absorbing structure according to Comparison Example 2 was formed in a similar fashion to Practical Example 5, with the exception that the surface sheet in Practical Example 5 was bonded and fixed through a width of approximately 15 mm at a total of eight points, four corner points and four center points, to the outer peripheral sections of the cavity open-top side surface of the sheet molding object B (the portions indicated by 16 in FIG. 3 and FIG. 4) with double-sided adhesive tape. The sound absorbing rate was measured for the sound absorbing structure of Comparison Example 2, similarly to Practical Example 5. The result of this was that, as illustrated in FIG. 13, the main peak of the sound absorbing rate was shifted to 630 Hz.

Practical Example 6

Figure 14:
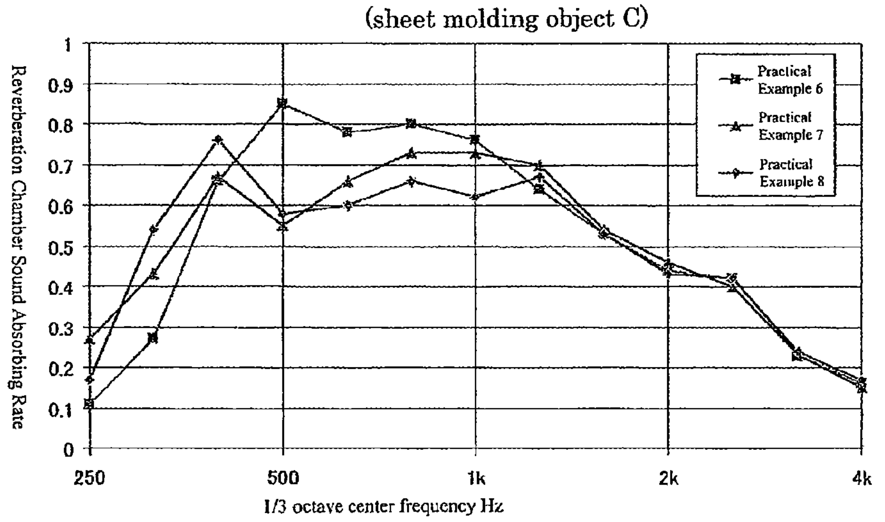
FIG. 14 is a graph of sound absorbing rate evaluation results 3 in a reverberation chamber.

A sheet molding object C having outer peripheral side surfaces 17 and flange sections 18 similar to the sheet molding object 11 in FIG. 3 and FIG. 4 was formed by vacuum molding using a 1.0 mm-thick polypropylene sheet. The dimensions of the sheet molding object C were 285×175×25 mm. The cavities in the sheet molding object C had a square open-top shape of 50×50 mm, a height of 25 mm at the edges and 20 mm in the central portion, and the number of cavities was 5×3=15. The width of the portions between the adjacent cavities (the cavity ridge sections, the portions indicated by reference numeral 19 in FIG. 3 and FIG. 4) was 5 mm, and the width of the outer peripheral sections on the cavity open-top side surface of the sheet molding object C (the portions indicated by 16 in FIG. 3 and FIG. 4) was 7.5 mm. Furthermore, the height of the outer peripheral side surfaces (the portions indicated by reference numeral 17 in FIG. 3 and FIG. 4) was 25 mm, and the width of the flange sections (the portions indicated by reference numeral 18 in FIG. 3 and FIG. 4) was 5 mm. Thereupon, a sound absorbing structure according to Practical Example 6 was obtained by coating an adhesive (Konishi “GP Clear”) onto the whole of the outer peripheral sections (the portions indicated by 16 in FIG. 3 and FIG. 4) on the cavity open-top side surface of the sheet molding object C, layering a surface sheet including a 285×175×0.5 mm polypropylene sheet onto the cavity open-top side surface of the sheet molding object C, and fixing the surface sheet to the outer peripheral sections of the sheet molding object C (the portions indicated by 16 in FIG. 3 and FIG. 4) with the adhesive. Twelve of sound absorbing structures according to Practical Example 6 were taken, double-sided adhesive tape was applied to the rear surfaces thereof and the sound absorbing structure were arranged on the floor of a reverberation chamber with a spacing of approximately 10 mm therebetween, and the sound absorbing rate was measured. The measurement results indicated that, as illustrated in FIG. 14, as the thickness of the surface sheet becomes thinner, so the main peak of the sound absorbing rate was shifted approximately ⅓ octave to 500 Hz on the high-frequency side.

Practical Example 7

A sound absorbing structure according to Practical Example 7 was formed similarly to Practical Example 6, with the exception that the thickness of the surface sheet was changed from 0.5 mm to 1.0 mm, and the sound absorbing rate was measured in a similar fashion to Practical Example 6. The result of this was that, whereas the cavities in Practical Example 3 had a height of 25 mm, the central portions of the bottom surfaces of the cavities in Practical Example 7 were raised up, in such a manner that the cavities had a height of 25 mm at the edges and 20 mm in the central portion, and therefore as shown in FIG. 14, the main peak of the sound absorbing rate at 400 Hz was somewhat lower, and the peak at 500 Hz or above became somewhat higher.

Practical Example 8

In Practical Example 7, a sound absorbing structure according to Practical Example 8 was formed and the sound absorbing rate was measured in a similar fashion to Practical Example 7, with the exception that the surface sheet was fixed by fusion only in the whole perimeter of the outer peripheral sections, using an ultrasonic fusion device (19.5 kHz) and a 4×70 mm horn, from the rear side of the outer peripheral sections of the cavity open-top side surface of the sheet molding object C (the portions indicated by 16 in FIG. 3 and FIG. 4). The result of this was that, as illustrated in FIG. 14, the 400 Hz main peak was somewhat higher and the peak at 500 Hz or above was somewhat lower, compared to Practical Example 7.

Practical Example 9

Figure 15:
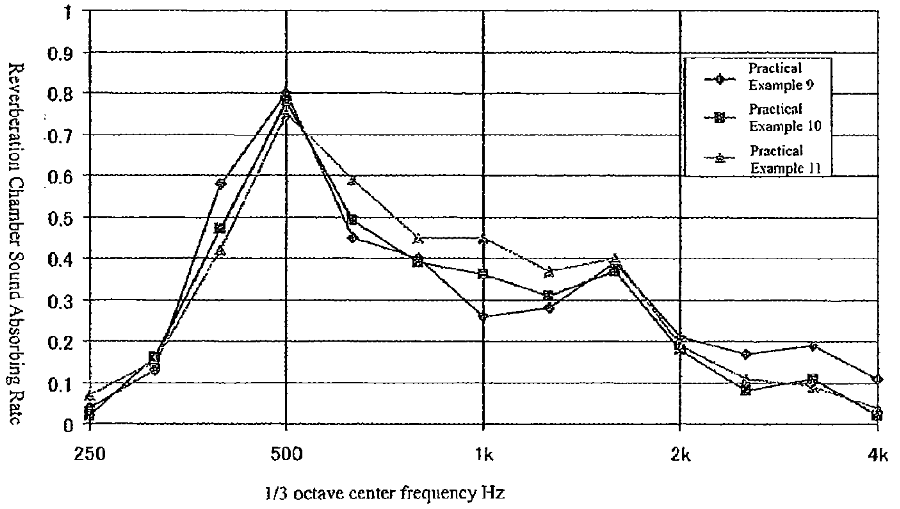
FIG. 15 is a graph of sound absorbing rate evaluation results 4 in a reverberation chamber.

A sheet molding object D having outer peripheral side surfaces 17 and flange sections 18 similar to the sheet molding object 11 in FIG. 3 and FIG. 4 was formed by vacuum molding using a 0.6 mm-thick polypropylene sheet. The dimensions of the sheet molding object D were 200×200×15 mm. The cavities in the sheet molding object D had a square open-top shape of 44×44 mm, a height of 15 mm, and the number of cavities was 4×4=16. The width of the portions between the adjacent cavities (the cavity ridge sections, the portions indicated by reference numeral 19 in FIG. 3 and FIG. 4) was 4 mm, and the width of the outer peripheral sections on the cavity open-top side surface of the sheet molding object D (the portions indicated by 16 in FIG. 3 and FIG. 4) was 6 mm. Furthermore, the height of the outer peripheral side surfaces (the portions indicated by reference numeral 17 in FIG. 3 and FIG. 4) was 15 mm, and the width of the flange sections (the portions indicated by reference numeral 18 in FIG. 3 and FIG. 4) was 10 mm. Next, a surface sheet including a polypropylene sheet of 200×200×1 mm was layered on the cavity open-top side surface of the sheet molding object D, and the entire periphery of the surface sheet was fixed to the outer peripheral sections of the sheet molding object by fusion similar to Practical Example 8, thereby yielding a sound absorbing structure according to Practical Example 9. Sixteen of sound absorbing structures according to Practical Example 9 were arranged on the floor of a reverberation chamber and the sound absorbing rate was measured in a similar fashion to Practical Example 1, with the exception that the 16 sound absorbing structures were bonded to the floor of the chamber with double-sided tape approximately 20 mm square at a total of eight points, four corner points of the flange sections and four center points. As a result of this, as illustrated in FIG. 15, there was a sharp main peak of the sound absorbing rate at 500 Hz.

Practical Example 10

In Practical Example 9, a sound absorbing structure according to Practical Example 10 was formed in a similar fashion to Practical Example 9, with the exception that a sheet molding object D was formed by vacuum molding from 1.0 mm-thick polypropylene sheet. The sound absorbing rate of the sound absorbing structure according to Practical Example 10 was measured in a similar fashion to Practical Example 9, with the exception that the entire perimeter of the flange sections forming the outer peripheral sections of the rear surface was bonded to the floor of the chamber with double-sided tape. As a result of this, as illustrated in FIG. 15, there was a sharp main peak of the sound absorbing rate at 500 Hz, although the peak was shifted slightly towards the high-frequency side in comparison with Practical Example 9.

Practical Example 11

A sheet molding object D' was formed in which the external peripheral sections of the sheet molding object D in Practical Example 10 were constituted by outer-peripheral-section inside-sections 161 and outer-peripheral-section outer-frame sections 165 erected on the outer periphery of the outer-peripheral-section inside-sections 161, as in FIG. 5-1. The outer-peripheral section inside-sections had a width of 6 mm, and the outer-peripheral-section outer-frame sections had a width of 4 mm and a height 3 mm greater (than the outer peripheral section inside sections 161). A sound absorbing structure according to Practical Example 11 was formed in a similar fashion to Practical Example 10, with the exception that a surface sheet was bonded with double-sided adhesive tape through a width of approximately 15 mm at a total of eight points, four corner points of the outer-peripheral-section inside-sections of the sheet molding object D' and four center points thereof, similarly to Comparison Practical Example 2. The sound absorbing structure according to Practical Example 11 was bonded to the chamber floor and the sound absorbing rate was measured in a similar fashion to Practical Example 10. As a result of this, it was confirmed that whereas Comparison Example 2 was shifted to the high-frequency side with respect to Practical Example 5, in Practical Example 11, the sound absorbing rate was virtually the same as Practical Example 10 and there was no shift in the main peak frequency, as illustrated in FIG. 15, and hence a closed space could be ensured substantially between the surface sheet and the sheet molding object.

Practical Example 12

Figure 16:
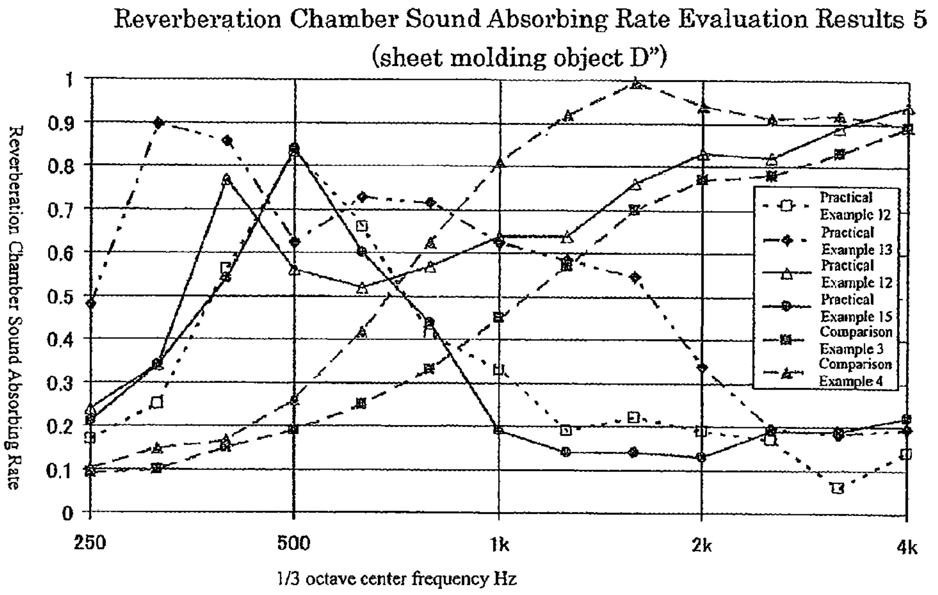
FIG. 16 is a graph of sound absorbing rate evaluation results 5 in a reverberation chamber.

In Practical Example 10, a sheet molding object D" was obtained by setting the cavity height of the sheet molding object D to 14 mm, and providing engaging depressions in the four corners and three grid intersection points on each edge. Furthermore, the surface sheet was provided with external peripheral bent surfaces 212 which are bent towards the sheet molding object 11 at the outer periphery of the edge portions 211 of the surface sheet 21 in such a manner that the outer peripheral bent surfaces 212 lie in contact with the outer peripheral side surfaces 17 of the sheet molding object 11, and flange sections 213 which are bent outwards from the ends of outer peripheral bent surfaces 212, as in FIG. 5-3, as well as engaging depressions located at the four corners and three equidistant points on each edge. A sound absorbing structure was formed by pressure fitting the surface sheet according to the present example onto the sheet molding object D", and the sound absorbing structure was bonded to the chamber floor similarly to Practical Example 10 and the sound absorbing rate was measured. The result of this was that, as illustrated in FIG. 16, the sound absorbing rate was virtually the same as Practical Example 10 in FIG. 15, there was no shift in the main peak frequency, and hence it was confirmed that a closed space could be ensured between the surface sheet and the sheet molding object.

Practical Example 13

Sound absorbing structures according to Practical Example 12 were layered on the upper surfaces of each of the surface sheets of 16 sound absorbing structures arranged as in Practical Example 12, and respectively bonded and fixed with double-sided tape over the whole of the rear surfaces of the sound absorbing structures, and the sound absorbing rate was measured in a similar fashion. As a result of this, a main peak was expected at 315 to 400 Hz only in case of forming a 30 mm thickness by a single layer, however, by layering together two layers, a high sound absorbing rate could be maintained in the range of 500 to 2 kHz, as well as having a main peak frequency at 315 to 400 Hz, as illustrated in FIG. 16, and hence it was confirmed that an effective countermeasure can be created in respect of noise having a broad central frequency, or noise having a variable central frequency, or the like.

Practical Example 14

10 mm of urethane foam ("Calm Flex F2" manufactured by Inoac Corporation) was layered on the upper surfaces of each of the surface sheets of 16 sound absorbing structures arranged as in Practical Example 12, and was bonded and fixed with double-sided tape over the whole of the surface of the foam, and the sound absorbing rate was measured in a similar fashion. As a result of this, as illustrated in FIG. 16, although the main peak frequency was shifted slightly to 400 Hz, a high sound absorbing rate was also maintained in a higher frequency region than this, as a result of the urethane foam, and hence it was confirmed that an effective countermeasure can be created in respect of noise having a broad central frequency or noise having a variable central frequency, or the like.

Comparison Example 3

The sound absorbing rate of urethane foam having a thickness of 15 mm corresponding to the Practical Examples 1 to 12 was measured. The results of this showed a high sound absorbing rate in the high-frequency region, as illustrated in FIG. 16, and a low sound absorbing rate in the vicinity of 500 Hz.

Comparison Example 4

The sound absorbing rate of urethane foam having a thickness of 25 mm corresponding to Practical Example 14 was measured. The results of this showed a high sound absorbing rate in a high-frequency region at or above 1 kHz, at this thickness also, as illustrated in FIG. 16, and a low sound absorbing rate in the vicinity of 500 Hz.

Practical Example 15

The sound absorbing rate was measured in a similar fashion to Practical Example 12, with the exception that the material used in Practical Example 12 was set to polyvinyl chloride, and the thickness was set to 0.7 mm. As illustrated in FIG. 16, the results of this showed sound absorbing characteristics virtually the same as those of Practical Example 12, and an area density of 0.91 kg/m$^2$ due to the specific weight of 1.3, which was virtually the same as the area density of 0.91 kg/m$^2$ of a 1.0 mm-thick polypropylene sheet having a specific gravity of 0.91, and therefore, similar sound absorbing properties could be confirmed.

The compositions of the sheet molding objects A, B, C, D, D', D" in the practical examples and the comparison examples are shown together in Table 1. Furthermore, the methods of fixing the sheet molding object and the surface sheet in the respective examples and comparison examples, the methods of fixing for measuring the sound absorbing rate, and the like are gathered in Table 2.

TABLE 1

| Type | Dimension of sheet moldng object (mm) | Cavity diameter (mm) | Width between cavities (mm) | Width of outer peripheral section(mm) | No. of cavity (mm) | Height of cavity (mm) | Height of side surface (mm) | Width of flange (mm) |
|---|---|---|---|---|---|---|---|---|
| A | 190 × 190 × 27 | 40 × 40 | 6 | 6 | 4 × 4 | 27 | Absence* | Absence* |
| B | 275 × 210 × 25 | 49 × 46 | 4 | 7 | 5 × 4 | 23 | 25 | 7 |
| C | 285 × 175 × 25 | 50 × 50 | 5 | 7.5 | 5 × 3 | 25/20 | 25 | 5 |
| D | 200 × 200 × 15 | 44 × 44 | 4 | 6 | 4 × 4 | 15 | 15 | 10 |
| D'** | 204 × 204 × 15 | 44 × 44 | 4 | 10 | 4 × 4 | 15 | 15 | 10 |
| D"*** | 200 × 200 × 15 | 44 × 44 | 4 | 6 | 4 × 4 | 14 | 15 | 10 |

*side surfaces and flanges are provided in the practical example 2.

**outer peripheral sections of D' have outer-peripheral-section outer-frame sections of 4 mm width and plus 3 mm height at the outer periphery of outer-peripheral-section inside-sectionsof 6 mm width.

***there are engaging depressions in the four comers and grid intersection points on each edge

TABLE 2

| | sheet molding object | thickness of sheet used for sheet molding object (mm) | portions between adjacent cavities | outer periphery fixing | side surfaces/ flange sections | thickness of surface sheet (mm) | rear surface fixing at measurement of sound absorbing rate | |
|---|---|---|---|---|---|---|---|---|
| Practical Example 1 | A | 1 | Non-adhesion | vinyl tape adhesion | absence | 1 | double-sided adhesive tape (whole surface) | Practical Example 1 |
| Comparison Example 1 | | | adhesion | | | | | Comparison Example 1 |
| Practical Example 2 | | | Non-adhesion | | presence | | | Practical Example 2 |
| Practical Example 3 | B | 0.7 | Non-adhesion | vinyl tape adhesion | presence | 1 | double-sided adhesive tape (whole surface) | Practical Example 3 |
| Practical Example 4 | | | | | | 1.5 | | Practical Example 4 |
| Practical Example 5 | | | | adhesive | | 1 | Non-adhesion | Practical Example 5 |
| Comparison Example 2 | | | | double-sided adhesive tape | | | | Comparison Example 2 |

TABLE 2-continued

| | sheet molding object | thickness of sheet used for sheet molding object (mm) | portions between adjacent cavities | outer periphery fixing | side surfaces/ flange sections | thickness of surface sheet (mm) | rear surface fixing at measurement of sound absorbing rate | |
|---|---|---|---|---|---|---|---|---|
| Practical Example 6 | C | 1 | Non-adhesion | (partially) adhesive | presence | 0.5 | double-sided adhesive tape | Practical Example 6 |
| Practical Example 7 | | | | | | 1 | (whole surface) | Practical Example 7 |
| Practical Example 8 | | | | welding | | | double-sided | Practical Example 8 |
| Practical Example 9 | D | 0.6 | Non-adhesion | welding | presence | 1 | double-sided adhesive tape fixing at 8 points of flange | Practical Example 9 |
| Practical Example 10 | | | | | | | double-sided adhesive tape | Practical Example 10 |
| Practical Example 11 | D' | 1 | | double-sided adhesive tape (partially) | | | fixing outer periphal flange | Practical Example 11 |
| Practical Example 12 | D" | 1 | Non-adhesion | pressure fitting | presence | 1 | double-sided adhesive tape | Practical Example 12 |
| Practical Example 13 | | | | | | | fixing outer periphal flange | Practical Example 13 |
| Practical Example 15 | | polyvinyl chloride | | | | polyvinyl chloride | | Practical Example 15 |
| Comparison Example 3 | | | | urethane foam 15 mm | | | | Comparison Example 3 |
| Comparison Example 4 | | | | urethane foam 25 mm | | | | Comparison Example 4 |

Figure 17:
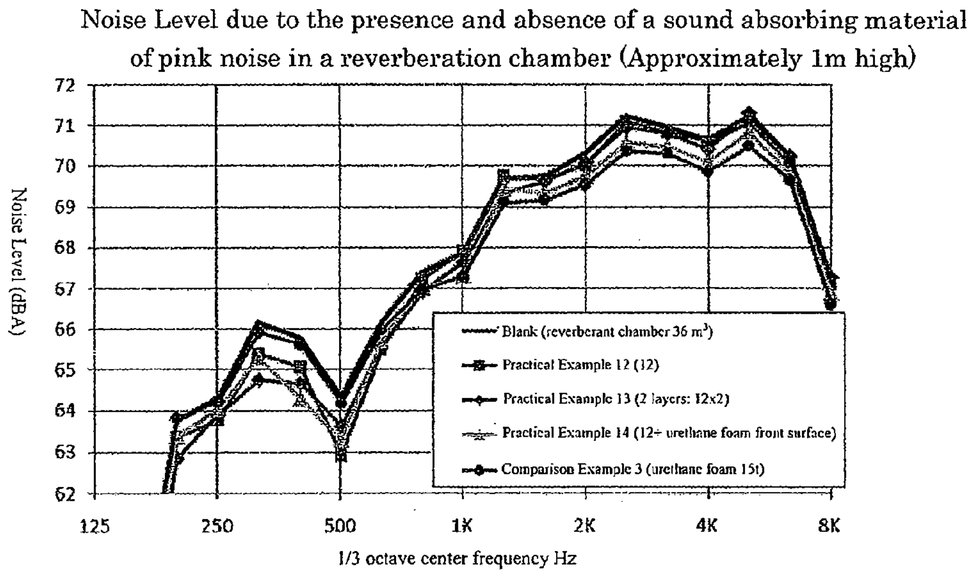
FIG. 17 is a graph of the difference in noise level due to the presence or absence of respective sound absorbing materials, when pink noise is generated constantly in a reverberation chamber.

In order to envisage the use of a sound absorbing structure according to the present invention as an actual noise countermeasure, the difference in noise level due to the presence and absence of a sound absorbing structure during constant generation of pink noise (AP approximately 82 dBA) in a reverberation chamber was evaluated for Practical Examples 12, 13, 14 and Comparison Example 3. The arrangement conditions were the same as the measurement of the sound absorbing rate by a reverberation chamber method according to Practical Example 1, with the exception that 12 sound absorbing structures were arranged and a polypropylene (PP) sheet was bonded thereto; the average value of the LAeq value (the equivalent noise level during 10 seconds) as measured in four directions at a point 1 m above the center of the 12 sound absorbing structures was found. The results are indicated in Table 3 and FIG. 17.

Noise Level due to the presence or absence of respective sound absorbing materials, when pink noise is generated constantly in a reverberation chamber

| | Frequency Hz | AP | 125 | 160 | 200 | 250 | 315 | 400 | 500 | 630 | 800 |
|---|---|---|---|---|---|---|---|---|---|---|---|
| Blank (PP sheet) | Noise level | 82.3 | 55.6 | 58.1 | 63.7 | 64.3 | 66.2 | 65.8 | 64.3 | 66.1 | 67.4 |
| Practical example 12 (12) (useful area 0.48 $m^2$, peripheral area 0.63 $m^2$) | Noise level | 82.2 | 55.6 | 57.9 | 63.3 | 63.8 | 65.4 | 65.1 | 62.9 | 65.5 | 67.2 |
| | Lowering amount | 0.1 | 0 | 0.2 | 0.4 | 0.5 | 0.8 | 0.7 | 1.4 | 0.6 | 0.2 |
| Practical example 13 (12) (useful area 0.48 $m^2$, peripheral area 0.63 $m^2$) | Noise level | 82.1 | 55.4 | 57.5 | 62.8 | 63.9 | 64.7 | 64.7 | 63.6 | 65.5 | 66.9 |
| | Lowering amount | 0.2 | 0.2 | 0.6 | 0.9 | 0.4 | 1.5 | 1.1 | 0.7 | 0.6 | 0.5 |
| Practical example 14 (12 + front surface of urethane foam, 10 t) (peripheral area 0.63 $m^2$) | Noise level | 81.9 | 55.6 | 58.0 | 63.4 | 64.0 | 65.3 | 64.3 | 63.3 | 65.7 | 67.0 |
| | Lowering amount | 0.4 | 0 | 0.1 | 0.3 | 0.3 | 0.9 | 1.5 | 1 | 0.4 | 0.4 |

-continued

Noise Level due to the presence or absence of respective sound absorbing materials, when pink noise is generated constantly in a reverberation chamber

| | | | | | | | | | | | |
|---|---|---|---|---|---|---|---|---|---|---|---|
| Comparison example 3 (urethane foam 15 t) (useful area 0.48 $m^2$, peripheral area 0.63 $m^2$) | Noise level | 81.7 | 55.6 | 58.2 | 63.8 | 64.2 | 65.9 | 65.6 | 64.2 | 66.0 | 67.2 |
| | Lowering amount | 0.6 | 0 | −0.1 | −0.1 | 0.1 | 0.3 | 0.2 | 0.1 | 0.1 | 0.2 |

| | Frequency Hz | 1K | 1.25K | 1.6K | 2K | 2.5K | 3.15K | 4K | 5K | 6.3K | 8K |
|---|---|---|---|---|---|---|---|---|---|---|---|
| Blank (PP sheet) | Noise level | 67.9 | 69.7 | 69.7 | 70.3 | 71.2 | 70.9 | 70.6 | 71.2 | 70.2 | 67.3 |
| Practical example 12 (12) (useful area 0.48 $m^2$, peripheral area 0.63 $m^2$) | Noise level | 67.7 | 69.5 | 69.7 | 70.2 | 71.1 | 70.8 | 70.6 | 71.1 | 70.0 | 67.1 |
| | Lowering amount | 0.2 | 0.2 | 0 | 0.1 | 0.1 | 0.1 | 0 | 0.1 | 0.2 | 0.2 |
| Practical example 13 (12) (useful area 0.48 $m^2$, peripheral area 0.63 $m^2$) | Noise level | 67.6 | 69.3 | 69.6 | 70.1 | 71.0 | 70.8 | 70.4 | 71.3 | 70.2 | 67.3 |
| | Lowering amount | 0.3 | 0.4 | 0.1 | 0.2 | 0.2 | 0.1 | 0.2 | −0.1 | 0 | 0 |
| Practical example 14 (12 + front surface of urethane foam, 10 t) (peripheral area 0.63 $m^2$) | Noise level | 67.3 | 69.5 | 69.3 | 69.7 | 70.6 | 70.5 | 70.1 | 70.8 | 69.8 | 66.9 |
| | Lowering amount | 0.6 | 0.2 | 0.4 | 0.6 | 0.6 | 0.4 | 0.5 | 0.4 | 0.4 | 0.4 |
| Comparison example 3 (urethane foam 15 t) (useful area 0.48 $m^2$, peripheral area 0.63 $m^2$) | Noise level | 67.3 | 69.1 | 69.2 | 69.5 | 70.4 | 70.3 | 69.9 | 70.5 | 69.7 | 66.6 |
| | Lowering amount | 0.6 | 0.6 | 0.5 | 0.8 | 0.8 | 0.6 | 0.7 | 0.7 | 0.5 | 0.7 |
| | | 67.9 | 69.7 | 69.7 | 70.3 | 71.2 | 70.9 | 70.6 | 71.2 | 70.2 | 67.3 |
| | | 67.7 | 69.5 | 69.7 | 70.2 | 71.1 | 70.8 | 70.6 | 71.1 | 70.0 | 67.1 |
| | | 0.2 | 0.2 | 0 | 0.1 | 0.1 | 0.1 | 0 | 0.1 | 0.2 | 0.2 |

These results correspond to the results of the reverberation chamber sound absorbing rate illustrated in FIG. 16, and in this reference example, it can be seen that a large noise reducing effect is obtained respectively at the frequencies where the sound absorbing rate is high. More specifically, the following beneficial effects are obtained. a. Practical Example 12 (one layer): Large effect centered on 500 Hz. b. Practical Example 13 (two layers): Large effect centered on lower frequencies: 315 and 400 Hz. c. Practical Example 14 (one layer+urethane foam): Large effect centered on 400 Hz and effects in high-frequency region also. d. Comparison Example 3 (urethane foam): Large effect in high-frequency region at or above 1 kHz. Furthermore, in order to reduce the noise level (in order to raise the noise reduction efficiency), the number of sound absorbing structures used (surface area) should be increased. Pink noise is essentially a uniform noise which is independent of the ⅓ octave frequency, but the pink noise used in the present reference example is noise having a high noise level in the high-frequency region and a low noise level around 500 Hz, and therefore, the effect in reducing the AP value of the noise level was low. Stated in a different way, it can be seen that the present sound absorbing structure has a characteristic sound absorbing peak in the vicinity of 500 Hz, and therefore is not effective in lowering the AP value of the noise level unless the noise has a central frequency around 500 Hz.

In this way, in the present invention, it is possible to increase the sound absorbing rate in a low-frequency region at around 500 Hz or below (this is also possible at around 500 Hz or above), and hence the invention can be used as a countermeasure for noise which is centered around this frequency. Moreover, by layering the sound absorbing structures in a plurality of layers and fixing and layering a porous sound absorbing material onto the surface sheet, the sound absorbing rate is raised in a broad frequency region, and it is possible to create an effective countermeasure to noise having a broad central frequency or noise having a variable central frequency, or the like.

Furthermore, in the present invention, a sound absorbing structure can be formed inexpensively and with a light weight, since the thickness of the sound absorbing structure can be reduced. Moreover, since cavities are created by recess sections formed by bending, and the surface sheet is not fixed to the sheet molding object in the portions between adjacent cavities, then the sound absorbing structure can bend readily in the portions between cavities, and the sound absorbing structure can be installed satisfactorily even in cases where there are curved portions on the installation surface.

By making use of the merits described above, the sound absorbing structure according to the present invention can be used suitably as a countermeasure for noise such as fans in construction machinery, a countermeasure for noise from motorized equipment, such as dust collectors and air conditioning systems in factories, a countermeasure for noise from electrical equipment, a countermeasure for noise from decks and pantographs in railway and bullet train equipment, and so on.

Practical Example 101

A polypropylene sheet having a thickness of 1.0 mm was vacuum molded to form a sheet molding object similar to the sheet molding object 311 illustrated in FIG. 22. The dimensions of the sheet molding object were 220×220×15 mm. The cavities 313 in the sheet molding object had a square open-top shape with edges of 44 mm, a cavity height of 14 mm, and the number of cavities was 4×4=16. The width of the portion between the adjacent cavities (the portions indicated by 319 in FIG. 22) and the width of the outer peripheral sections on the cavity open top side surface of the sheet molding object (the portions indicated by 316 in FIG. 22) were both 6 mm, and a projecting section was formed as an engaging section in the four corners of the outer peripheral side surfaces (the portions indicated by 317 in FIG. 22). On the other hand, a polypropylene sheet having a thickness of 1 mm was vacuum molded to form a surface sheet similar to the surface sheet 320 illustrated in FIG. 22. The surface sheet is formed in such a manner that the outer peripheral side surfaces (the portions indicated by 321 in FIG. 22) lie in contact with the outer peripheral side surfaces of the sheet molding object (the portions indicated by 317 in FIG. 22) and furthermore flange sections (the portions indicated by 323 in FIG. 22) are formed on the top ends of outer peripheral side surfaces (the portions indicated by 321 in FIG. 22), and recess sections which engage with the projecting sections of the engaging portions provided on the outer peripheral side surfaces of the sheet molding object (the portions indicated by 317 in FIG. 22) are formed in the four corners of the outer peripheral side surfaces (the portions indicated by 321 in FIG. 22) as engaging sections of the surface sheet. The surface sheet was placed on the sheet molding object formed in this way and the engaging sections provided on the outer peripheral side surfaces of the surface sheet (the portions indicated by 321 in FIG. 22) were engaged with the engaging sections provided on the outer peripheral surfaces of the sheet molding object (the portions indicated by 317 in FIG. 22), thereby fixing the surface sheet to the outer peripheral sections of the sheet molding object and forming a sound absorbing structure. The 1 mm-thick polypropylene sheet used for the sheet molding object and the surface sheet had an area density of 0.91 kg/m$^2$.

Twelve of the sound absorbing structures formed in this way were taken, double-sided adhesive tape was applied to the rear surfaces of the flange sections 318, and the 12 sound absorbing structures were bonded and fixed to the surface of a base material including a 1.0 mm-thick polypropylene sheet in which the dimension L2 in FIG. 18 was 1000 mm and the dimension L1 was 800 mm, the gaps a and bin FIG. 18 each being set to 10 mm. The gaps c and d between the edges of the base material and the sound absorbing structures in FIG. 18 were 60 mm and 45 mm, respectively. A cover material including a polypropylene spunbond nonwoven fabric (product name: SP1100E-UVB, made by Maeda Kosen Co., Ltd., 100 g/m$^2$ mass per unit area, 0.52 mm thickness, and air permeability 42 cc/cm$^2$/s) was placed so as to cover the 12 sound absorbing structures, and the outermost periphery of the cover material was fixed to the peripheral edge of the base material by 15 mm-side double-sided adhesive tape, thereby forming a composite sound absorbing structure according to Practical Example 101. The cover material which covered the 12 sound absorbing structures and was fixed to the peripheral edges of the base material was layered tautly on the surface of the surface sheets of the 12 sound absorbing structures, and covered the gaps between the sound absorbing structures while making contact with the surface sheets, as shown in FIG. 19.

Comparison Example 101

A composite sound absorbing structure according to Comparison Example 101 having a non-air permeable cover material was formed in a similar fashion to Practical Example 101, with the exception that double-sided adhesive tape was bonded to the whole of the rear surface of the cover material according to Practical Example 101, thus making the cover material non-air permeable.

Comparison Example 102

A composite sound absorbing structure according to Comparison Example 102 without a cover material was formed in a similar fashion to Practical Example 101, with the exception that the cover material in Practical Example 101 was omitted and gaps were left between the sound absorbing structures.

Practical Example 102

A composite sound absorbing structure according to Practical Example 102 was formed in a similar fashion to Practical Example 101, with the exception that the gaps a and b between the sound absorbing structures in FIG. 18 were 50 mm and 30 mm, respectively, and the gaps c and d between the edges of the base material and the sound absorbing structures were 20 mm and 15 mm, respectively. A composite sound absorbing structure according to Comparison Example 103 without a cover material was formed in a similar fashion to Comparison Example 102, with the exception that the gaps a and b between the sound absorbing structures in FIG. 18 were 50 mm and 30 mm, respectively, and the gaps c and d between the edges of the base material and the sound absorbing structures were 20 mm and 15 mm, respectively.

Practical Example 103

A composite sound absorbing structure according to Practical Example 103 was formed in a similar fashion to Practical Example 101, with the exception that a cover material was bonded to the surfaces of the surface sheets of the sound absorbing structure by double-sided adhesive tape.

Practical Example 104

A composite sound absorbing structure according to Practical Example 104 was formed in a similar fashion to Practical Example 101, with the exception that the thickness of the surface sheet was set to 0.6 mm (area density 0.55 kg/m$^2$). The thickness of the sheet of the sheet molding object was unchanged at 1.0 mm.

Practical Example 105

A composite sound absorbing structure according to Practical Example 105 was formed in a similar fashion to Practical Example 102, with the exception that the thickness of the surface sheet was set to 0.6 mm (area density 0.55 kg/m$^2$). The thickness of the sheet of the sheet molding object was unchanged at 1.0 mm.

Comparison Example 104

A composite sound absorbing structure according to Comparison Example 104 having a non-air permeable cover material was formed in a similar fashion to Comparison Example 101, with the exception that the thickness of the surface sheet was set to 0.6 mm (area density 0.55 kg/m$^2$).

Comparison Example 105

A composite sound absorbing structure according to Comparison Example 105 without a cover material was formed in a similar fashion to Comparison Example 102, with the exception that the thickness of the surface sheet was set to 0.6 mm (area density 0.55 kg/m$^2$). The thickness of the sheet of the sheet molding object was unchanged at 1.0 mm.

Comparison Example 106

A composite sound absorbing structure according to Comparison Example 106 without a cover material was formed in a similar fashion to Comparison Example 103, with the exception that the thickness of the surface sheet was set to 0.6 mm (area density 0.55 kg/m$^2$). The thickness of the sheet of the sheet molding object was unchanged at 1.0 mm.

Practical Example 106, 107, 108

Composite sound absorbing structures were formed for Practical Example 106 (Practical Example 101→Practical Example 106), Practical Example 107 (Practical Example 102→Practical Example 107), and Practical Example 108 (Practical Example 103→Practical Example 108), similarly to Practical Example 101, Practical Example 102, Practical Example 103, with the exception that sound absorbing structures were formed in two layers.

Comparison Example 107, 108

Composite sound absorbing structures according to Comparison Example 107 (Comparison Example 102→Comparison Example 107) and Comparison Example 108 (Comparison Example 103→Comparison Example 108) were formed in a similar fashion to Comparison Example 102 and Comparison Example 103, with the exception that sound absorbing structures were formed in two layers.

Practical Example 109

A composite sound absorbing structure according to Practical Example 109 was formed in a similar fashion to Practical Example 102, with the exception that the material of the sheet molding object and the surface sheet was changed to vinyl chloride resin (PVC) having a thickness of 0.7 mm and an area density of 0.91 kg/m$^2$, and the material of the cover material was changed to a polypropylene spunbond nonwoven fabric (product name: SP1100E-B, made by Maeda Kosen, fire retardant treatment, weight 100 g/m$^2$, thickness 0.52 mm, air permeability 54 cc/cm$^2$/s).

Practical Example 110

A composite sound absorbing structure according to Practical Example 110 was formed in a similar fashion to Practical Example 102, with the exception that the material of the cover material was changed to polyethylene terephthalate (PET) spunbond nonwoven fabric (made by Unitika Co., Ltd., weight 100 g/m$^2$, thickness 0.16 mm, air permeability 5 cc/cm$^2$/s).

Practical Example 111

A composite sound absorbing structure according to Practical Example 111 was formed in a similar fashion to Practical Example 102, with the exception that the material of the cover material was changed to glass cloth (product name: WLA 180M107, made by Nittobo Co., Ltd., flat weave, weight 205 g/m$^2$, thickness 0.18 mm, air permeability 20 cc/cm$^2$/s).

Comparison Example 109

A composite sound absorbing structure according to Comparison Example 109 having a non-air permeable cover material was formed in a similar fashion to Practical Example 102, with the exception that the material of the cover material was changed to urethane film (thickness 0.15 mm, air permeability 00 cc/cm$^2$/s).

Practical Example 112

A sound absorbing structure was formed by using a lattice structure having a thickness of 1.0 mm in the outer frame and the lattice section, a height of 17 mm and consisting of 8×8 cavities of a 250 mm-square polyethylene quadrilateral lattice obtained by extrusion molding, laying a 1 mm-thick 250 mm-square polypropylene film on the upper portion and the lower portion thereof, and fixing the outer peripheral sections by vinyl tape to the outer peripheral side surfaces of the lattice structure. A composite sound absorbing structure according to Practical Example 112 was formed in a similar fashion to Practical Example 101 by bonding and fixing to a 1000 mm×800 mm polypropylene sheet and laying on and fixing a cover material, with the exception that 6 of the sound absorbing structures formed in this way were taken, double-sided adhesive tape was bonded to the whole of the rear surfaces thereof, and the gaps indicated by a and b in FIG. 18 were set respectively to 260 mm and 105 mm, and the gaps c and d between the edges of the base material and the sound absorbing structures were set respectively to 20 mm and 20 mm.

Comparison Example 110

A composite sound absorbing structure according to Comparison Example 110 without a cover material was formed in a similar fashion to Practical Example 112, with the exception that the cover material in Practical Example 112 was omitted and gaps were left between the sound absorbing structures.

Table 4 shows the compositions of the respective Practical Examples and Comparison Examples.

TABLE 4

| | sound absorbing structure | | | | | cover | | | | |
|---|---|---|---|---|---|---|---|---|---|---|
| | shape | material | surface sheet area density kg/m$^2$ | no. of layers | intervals*1 | presence/ absence | material | thickness mm | permeability cc/cm$^2$/s | fixing method |
| Practical Example 101 | 6th embodiment | PP | 0.91 | 1 layer | 10/10 | presence | PP nonwoven cloth | 0.52 | 42 | periphery |
| Comparison Example 101 | | | | | | | | | 0 | whole surface |
| Comparison Example 102 | | | | | | | | absence | | |
| Practical Example 102 | | | | | 30/50 | presence | PP nonwoven cloth | 0.52 | 42 | periphery |
| Practical Example 103 | | | | | | | | | | periphy + sound absorbing material |

TABLE 4-continued

| | sound absorbing structure | | | | | cover | | | | |
|---|---|---|---|---|---|---|---|---|---|---|
| | shape | material | surface sheet area density kg/m$^2$ | no. of layers | intervals*1 | presence/absence | material | thickness mm | permeability cc/cm$^2$/s | fixing method |
| Comparison Example 103 | | | | | | | | absence | | |
| Practical Example 104 | | | 0.55 | | 10/10 | presence | PP nonwoven cloth | 0.52 | 42 | periphery |
| Comparison Example 104 | | | | | | | | | 0 | whole surface |
| Comparison Example 105 | | | | | | | | absence | | |
| Practical Example 105 | | | | | 30/50 | presence | PP nonwoven cloth | 0.52 | 42 | periphery |
| Comparison Example 106 | | | | | | | | absence | | |
| Practical Example 106 | | | 0.91 | 2 layers | 10/10 | presence | PP nonwoven cloth | 0.52 | 42 | periphery |
| Comparison Example 107 | | | | | | | | absence | | |
| Practical Example 107 | | | | | 30/50 | presence | PP nonwoven cloth | 0.52 | 42 | periphery |
| Practical Example 108 | | | | | | | | | | periphy + sound absorbing material |
| Comparison Example 108 | | | | | | | | | | |
| Practical Example 109 | | PVC | 0.91 | 1 layer | 30/50 | presence | PP nonwoven cloth | 0.52 | 54 | periphery |
| Practical Example 110 | | PP | | | | | PETPP nonwoven cloth | 0.16 | 5 | |
| Practical Example 111 | | | | | | | glass cloth | 0.18 | 20 | |
| Comparison Example 109 | | | | | | | urethane film | 0.15 | 0 | |
| Practical Example 112 | 7th embodiment | PP | 0.91 | 1 layer | 105/260 | presence | PP nonwoven cloth | 0.52 | 42 | periphery |
| Comparison Example 110 | | | | | | | | absence | | |

*1Apart from Practical Example 112 and Comparison Example 110: the gap when 220 mm-square sound aborbing structures are arranged 4 × 3 on a 1000 × 800 mm surface.
In Practical Example 112 and Comparison Example 110: the gap when 250 mm-square sound absorbing structures are arranged 3 × 2 on a 1000 × 800 mm surface.
Gap: 10/10 mm: Outer periphal gap 45/60 mm; 30/50 mm; 15/20 mm, 105/260: 20/20 mm The composite sound absorbing structures of the respective Practical Examples and Comparison Examples were respectively arranged on the floor of a reverberation chamber and the sound absorbing rate was measured on the basis of the reverberation chamber method in JIS A 1409. This sound absorbing rate indicated the sound absorbing rate (sound absorbing capacity) at a ⅓ octave frequency converted per 1000 mm×800 mm surface area of the polypropylene sheet of the base material but did not indicate the sound absorbing rate for actual area of each sound absorbing material. The volume of the reverberant chamber was 36 m$^3$. FIGS. 27 to 32 show the measurement results.

Figure 27:
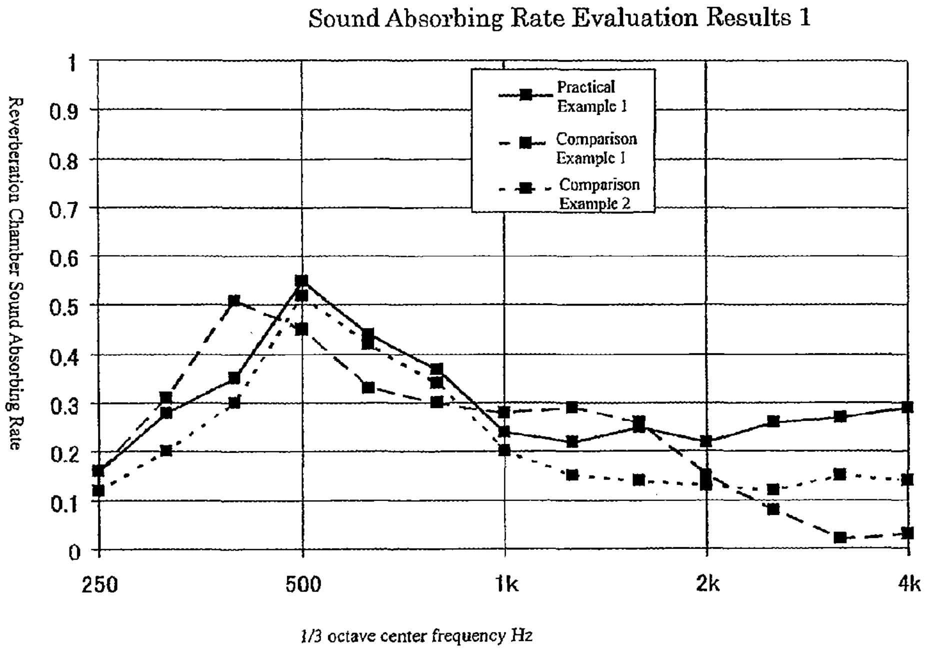
FIG. 27 is a graph of sound absorbing rate evaluation results 1 in a reverberation chamber.

FIG. 27 shows measurement results for the sound absorbing rate according to a reverberation chamber method for Practical Example 101, Comparison Example 101 and Comparison Example 102. Practical Example 101 displayed sound absorbing characteristics centered on 500 Hz, and at all frequencies had a sound absorbing rate several % higher than Comparison Example 102, which did not employ a cover material (nonwoven fabric), as well as having a sound absorbing rate more than 10% higher than Comparison Example 102 in the high-frequency region at or above 1 kHz. Furthermore, Comparison Example 101 which employed a non-air permeable cover material had a main peak shifted closer to 400 Hz in comparison with Practical Example 101, but had a lower sound absorbing rate in the high-frequency region at or above 1.6 kHz.

Figure 28:
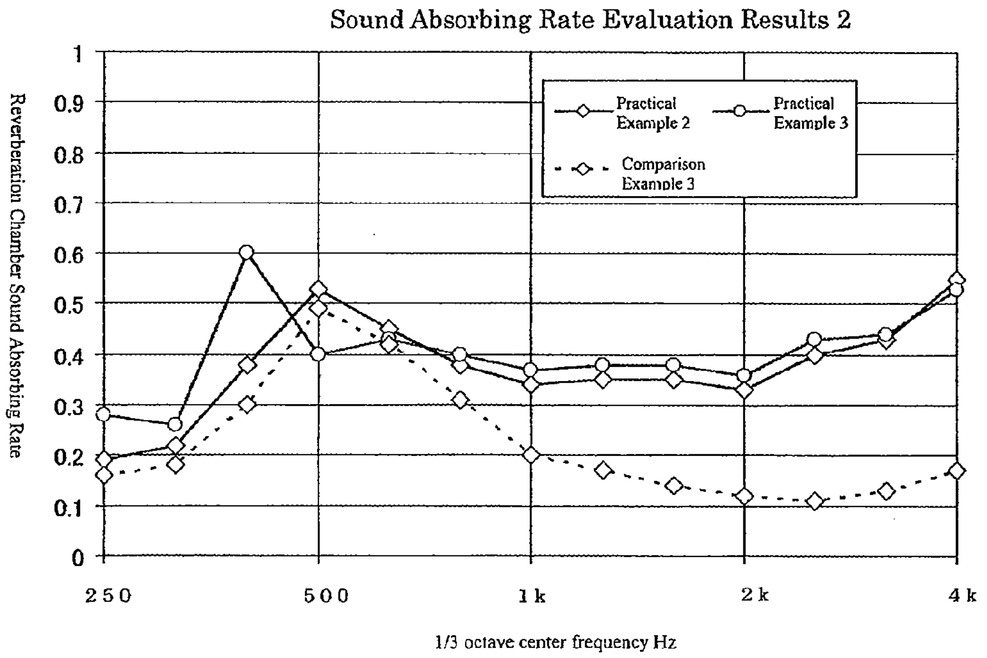
FIG. 28 is a graph of sound absorbing rate evaluation results 2 in a reverberation chamber.

FIG. 28 shows measurement results for the sound absorbing rate according to a reverberation chamber method for Practical Example 102, Practical Example 103 and Comparison Example 103. In Practical Example 102, the gaps (spaces) between the sound absorbing structures performing membrane oscillation was greater than in Practical Example 101, and therefore the sound absorbing rate in the high-frequency region was greatly improved. Practical Example 103 produced similar results to Practical Example 102, with the exception that the main peak was shifted from 500 Hz to 400 Hz. On the other hand, Comparison Example 103 did not have a cover material, similarly to Comparison Example 102, and therefore the sound absorbing rate in the high-frequency region was reduced, similarly to Comparison Example 102.

Figure 29:
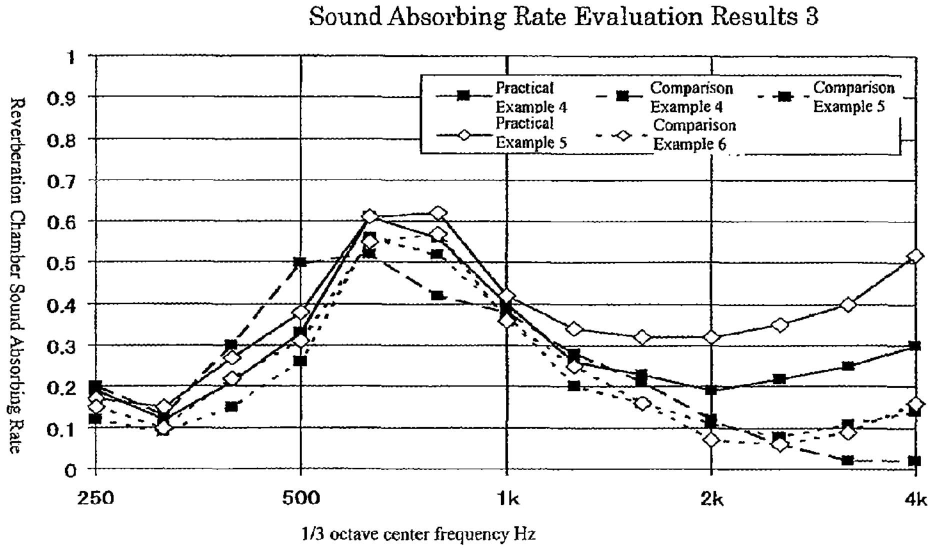
FIG. 29 is a graph of sound absorbing rate evaluation results 3 in a reverberation chamber.

FIG. 29 shows measurement results for the sound absorbing rate according to a reverberation chamber method for Practical Example 104, Practical Example 105, Comparison Example 104, Comparison Example 105 and Comparison Example 106. Practical Example 104 and Practical Example 105, and Comparison Example 104, Comparison Example 105 and Comparison Example 106 all had a smaller thickness (area density) of the surface sheet compared to Practical Example 101, Practical Example 102, Comparison Example 101, Comparison Example 102 and Comparison Example 103, and therefore the main peak in the medium frequency region was shifted toward the high-frequency side.

Figure 30:
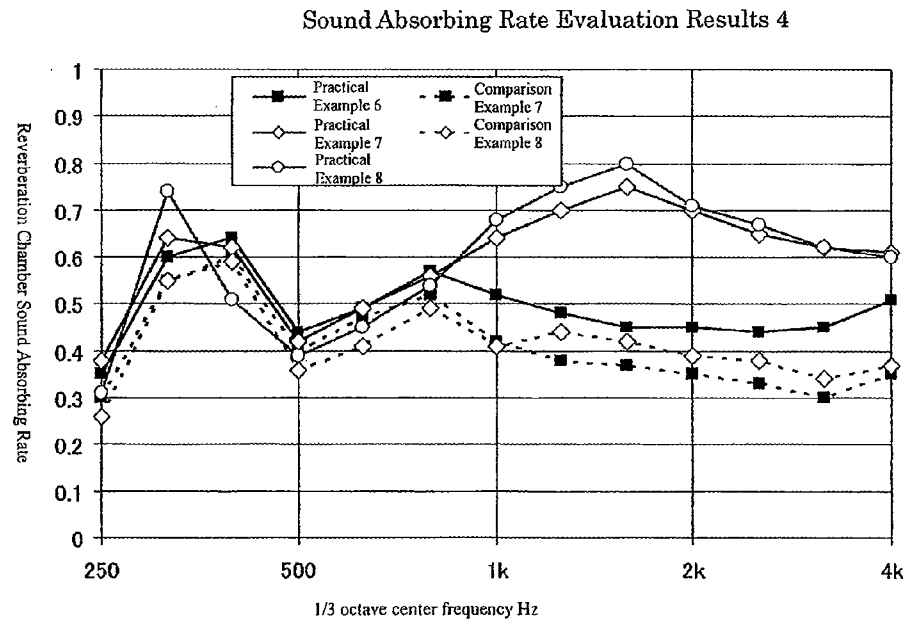
FIG. 30 is a graph of sound absorbing rate evaluation results 4 in a reverberation chamber.

FIG. 30 shows measurement results for the sound absorbing rate according to a reverberation chamber method for Practical Example 106, Practical Example 107, Practical Example 108, Comparison Example 107 and Comparison Example 108. Providing two layers of structures performing membrane oscillation resulted in a higher sound absorbing rate in the high-frequency region, even when there was no cover material (Comparison Examples 107, 108), but the presence of a cover material improved the sound absorbing rate in the high-frequency region yet further (Practical Example 106, Practical Example 107), and in Practical Example 108 in which a cover material was bonded and fixed to the structures performing membrane oscillation, the main peak in the medium-frequency region was shifted toward the low-frequency side, similarly to Practical Example 103.

Figure 31:
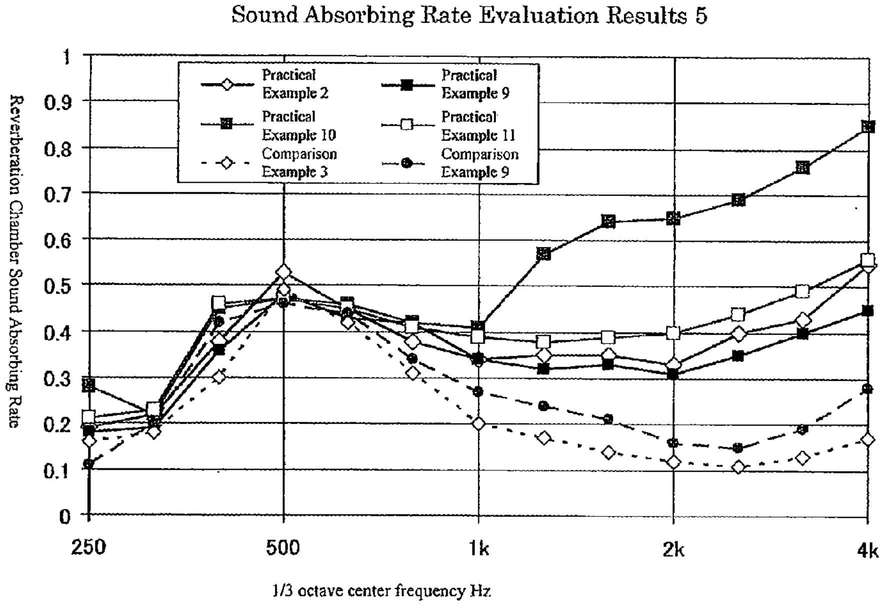
FIG. 31 is a graph of sound absorbing rate evaluation results 5 in a reverberation chamber.

FIG. 31 shows measurement results for the sound absorbing rate according to a reverberation chamber method for Practical Example 109, Practical Example 110, Practical Example 111 and Comparison Example 109, which are shown alongside the sound absorbing rate measurement results for Practical Example 102 and Comparison Example 103 for the purposes of comparison. Practical Example 110 had a lower air permeability of the cover material, and showed an improved sound absorbing rate in the high-frequency region compared to Practical Examples 102, 109, 111. Comparison Example 109 had a non-air permeable cover material and the sound absorbing rate was low in the high-frequency region, similarly to the Comparison Example 103 which did not have a cover material.

Figure 32:
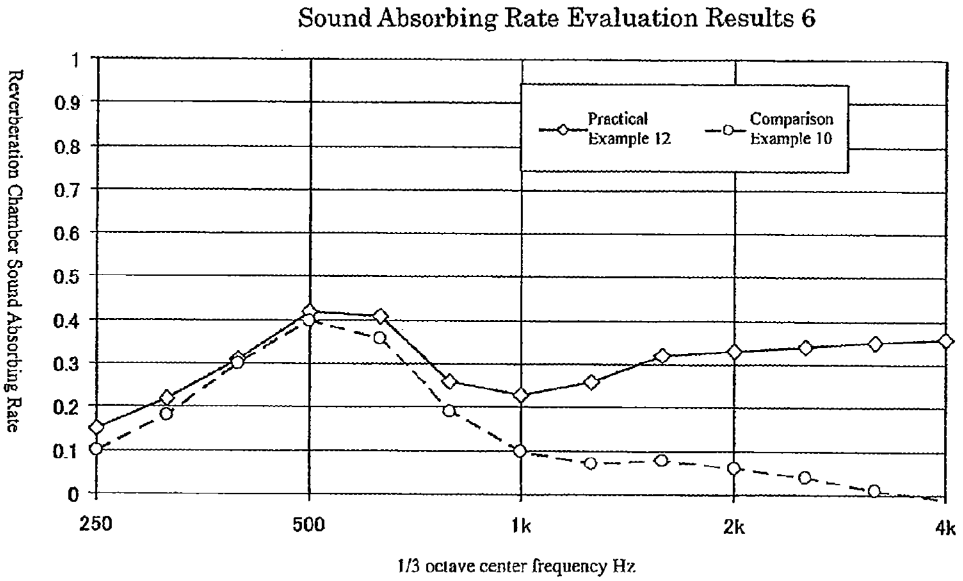
FIG. 32 is a graph of sound absorbing rate evaluation results 6 in a reverberation chamber.

FIG. 32 shows the measurement results of the sound absorbing rate according to a reverberation chamber method for Practical Example 112 and Comparison Example 110. Practical Example 112 and Comparison Example 110 have a similar relationship to Practical Example 101 and Comparison Example 102 in that Practical Example 112 showed a sound absorbing rate several % higher at all frequencies than Comparison Example 110, which does not have a cover material, and had a sound absorbing rate more than 10% higher than Comparison Example 110 in a high-frequency region at or above 1 kHz.

As described above, a composite sound absorbing structure in which the surfaces of a plurality of arranged and fixed sound absorbing structures according to the present invention are covered in tight contact by a cover material is able to greatly improve the sound absorbing rate in a high-frequency region while suppressing increase in thickness, as well as being able to improve the sound absorbing rate in a medium-frequency region also. Moreover, by fixing a cover material on the surface of a sound absorbing structure, the main peak of the medium-frequency region can be shifted to the low-frequency side.

By making use of the merits described above, the composite sound absorbing structure according to the present invention, for example, can be used suitably as a countermeasure for noise such as fans in construction machinery, a countermeasure for noise from motorized equipment, such as dust collectors and air conditioning systems in factories, a countermeasure for noise from electrical equipment, a countermeasure for noise from decks and pantographs in railway and bullet train equipment, and soon.

The present invention is not limited to the examples given here and may be implemented by compositions within a range that does not deviate from the details stated in the claims.

What is claimed is:

1. A sound absorbing structure, comprising:

a non-air permeable sheet molding object having, on one surface side thereof, a plurality of cavities of recess with bottoms formed by bending so as to be adjacent to each other; and a non-air permeable surface sheet which is layered on the sheet molding object so as to cover open-tops of the plurality of cavities, wherein the surface sheet, being a first membrane oscillation surface, is fixed at outer peripheral sections of the sheet molding object and is not fixed to the sheet molding object in portions between adjacent ones of the plurality of cavities, top surfaces of ridge portions of the sheet molding object between the adjacent ones of the plurality of cavities have one of a same height as and a same gap distance to top surfaces of the outer peripheral sections of the sheet molding object, the sheet molding object is a second membrane oscillation surface that displays a lesser oscillation effect than the surface sheet, and a thickness of the sheet molding object is at least equal to a thickness of the surface sheet so that the sheet molding object displays the lesser oscillation effect than the surface sheet.

2. The sound absorbing structure according to claim 1, wherein the sheet molding object has outer peripheral side surfaces formed by bending the sheet molding object from edges, on a cavity open-top side surface, of the outer peripheral sections of the sheet molding object toward an opposite side to the cavity open-top side surface, and has flange sections bent outwards from ends of the outer peripheral side surfaces.

3. The sound absorbing structure according to claim 2, wherein outer peripheral bent surfaces which are bent towards the sheet molding object are provided on the edges of the surface sheet and the outer peripheral bent surfaces of the surface sheet make tight contact with the outer peripheral side surfaces of the sheet molding object, thereby creating a closed space between the surface sheet and the sheet molding object.

4. The sound absorbing structure according to claim 1, wherein outer peripheral sections of the sheet molding object on a cavity open-top side surface of the sheet molding object include outer-peripheral-section inside-sections on which edge portions of the surface sheet are placed and outer-peripheral-section outer-frame sections erected on an outer periphery if the outer-peripheral-section inside-sections.

5. The sound absorbing structure according to claim 1, wherein the sheet molding object is formed by vacuum molding.

6. The sound absorbing structure according to claim 1, wherein a plurality of the sound absorbing structure is layered by fixing a rear surface of the sheet molding object of one sound absorbing structure onto an upper surface of the surface sheet of an other sound absorbing structure.

7. The sound absorbing structure according to claim 6, wherein a porous sound absorbing material is fixed and layered on the upper surface of the surface sheet of the other sound absorbing structure.

8. The sound absorbing structure according to claim 6, wherein a porous sound absorbing material is fixed and layered on an upper surface of the surface sheet of an uppermost sound absorbing structure that is in an uppermost position of the plurality of the sound absorbing structure.

9. The sound absorbing structure according to claim 1, further comprising:

a base material;

a plurality of the sound absorbing structure, being a plurality of sound absorbing structures, arranged and fixed on a surface of the base material; and a cover material provided so as to cover the plurality of sound absorbing structures, wherein the base material has non-air permeability, the plurality of sound absorbing structures is arranged and fixed on the surface of the base material, with gaps being provided between the plurality of sound absorbing structures, and the cover material includes an air permeable sheet and is arranged on surfaces of surface sheets of the plurality of sound absorbing structures so as to cover the gaps between the plurality of sound absorbing structures, and a perimeter of the cover material is fixed to the base material, whereby sound having frequencies in medium and high-frequency ranges is absorbed.

10. The sound absorbing structure according to claim 9, wherein air permeability of the cover material is 1 to 100 $cc/cm^2/s$.

11. The sound absorbing structure according to claim 10, wherein the cover material is fixed to the surfaces of the surface sheets of the plurality of sound absorbing structures.

12. The sound absorbing structure according to claim 9, wherein the surface sheets of the plurality of sound absorbing structures are layered on one surface of a honeycomb material having a plurality of cavities, the surface sheets are fixed to perimeter edges of the honeycomb material, and the surface sheets are not fixed to the honeycomb material on insides of the honeycomb material.

13. The sound absorbing structure according to claim 10, wherein the surface sheets of the plurality of sound absorbing structures are layered on one surface of a honeycomb material having a plurality of cavities, the surface sheets are fixed to perimeter edges of the honeycomb material, and the surface sheets are not fixed to the honeycomb material on insides of the honeycomb material.

14. The sound absorbing structure according to claim 11, wherein the surface sheets of the plurality of sound absorbing structures are layered on one surface of a honeycomb material having a plurality of cavities, the surface sheets are fixed to perimeter edges of the honeycomb material, and the surface sheets are not fixed to the honeycomb material on insides of the honeycomb material.

15. The sound absorbing structure according to claim 2, wherein the sheet molding object is formed by vacuum molding.

16. The sound absorbing structure according to claim 3, wherein the sheet molding object is formed by vacuum molding.

17. The sound absorbing structure according to claim 4, wherein the sheet molding object is formed by vacuum molding.

18. The sound absorbing structure according to claim 1, wherein the thickness of the surface sheet is at most 2 millimeters.

19. The sound absorbing structure according to claim 1, wherein a density of the surface sheet is at least 0.05 $kg/m^2$ and at most 2.0 $kg/m^2$.

20. The sound absorbing structure according to claim 1, wherein the thickness of the sheet molding object is approximately 1 millimeter.

* * * * *